United States Patent
Graham et al.

(10) Patent No.: US 7,804,498 B1
(45) Date of Patent: Sep. 28, 2010

(54) VISUALIZATION AND STORAGE ALGORITHMS ASSOCIATED WITH PROCESSING POINT CLOUD DATA

(76) Inventors: Lewis N Graham, 104 Marquise Way, Madison, AL (US) 35758; Kyle Ellison, 3714 Railway Ave. SE., Huntsville, AL (US) 35801; Bradley K Herman, 101 Lovellen La., Harvest, AL (US) 35749; Carl S Riddell, 105 Durham Dr., Madison, AL (US) 35758

( * ) Notice: Subject to any disclaimer, the term of this patent is extended or adjusted under 35 U.S.C. 154(b) by 398 days.

(21) Appl. No.: 11/227,300

(22) Filed: Sep. 15, 2005

Related U.S. Application Data

(60) Provisional application No. 60/609,933, filed on Sep. 15, 2004.

(51) Int. Cl.
G06T 15/00 (2006.01)
G06T 17/00 (2006.01)

(52) U.S. Cl. ........... 345/419; 345/424
(58) Field of Classification Search ........... None
See application file for complete search history.

(56) References Cited

U.S. PATENT DOCUMENTS

| | | | | |
|---|---|---|---|---|
| 4,559,605 | A * | 12/1985 | Norsworthy | 708/403 |
| 6,075,541 | A * | 6/2000 | Maclinovsky | 345/423 |
| 6,374,198 | B1 | 4/2002 | Schifa et al. | |
| 6,459,428 | B1 * | 10/2002 | Burk et al. | 345/419 |
| 6,496,189 | B1 * | 12/2002 | Yaron et al. | 345/428 |
| 6,611,267 | B2 | 8/2003 | Migdal et al. | |
| 6,654,690 | B2 | 11/2003 | Rahmes et al. | |
| 7,034,841 | B1 | 4/2006 | Weiblen et al. | |
| 7,317,456 | B1 * | 1/2008 | Lee | 345/427 |
| 2002/0167518 | A1 * | 11/2002 | Migdal et al. | 345/428 |
| 2003/0052875 | A1 * | 3/2003 | Salomie | 345/419 |
| 2004/0090445 | A1 * | 5/2004 | Iizuka et al. | 345/679 |
| 2004/0217956 | A1 * | 11/2004 | Besl et al. | 345/419 |

OTHER PUBLICATIONS

McGaughey, R. J.; Carson, W. W. 2003. Fusing LIDAR data, photographs, and other data using 2D and 3D visualization techniques. In: Proceedings of Terrain Data: Applications and Visualization—Making the Connection, Oct. 28-30, 2003; Charleston, South Carolina: Bethesda, MD: American Society for Photogrammetry and Remote Sensing.*

(Continued)

*Primary Examiner*—Daniel F Hajnik
(74) *Attorney, Agent, or Firm*—Mark Clodfelter

(57) ABSTRACT

A plurality of algorithms for interpreting and displaying point cloud data are disclosed. Typically, a virtual grid is constructed over point cloud data, with intersections of the grid at a predetermined spacing that may be dependent on density of the point cloud. Several methods are implemented that utilize tuple data from tuples near a respective intersection to populate intersections of the grid with data. In most embodiments, the intersections of the grid correspond to pixels in a raster image. The tuple data may be manipulated to determine Nyquist spacing of points in a point cloud and portions thereof, develop monoscopic and stereoscopic images, and enhance selected features of an image. Additional algorithms are disclosed that reduce storage and computational requirements during processing of point clouds. Such algorithms use a tiled grid structure wherein processing and data storage proceeds in one or a few of the tiles at a time.

22 Claims, 14 Drawing Sheets

OTHER PUBLICATIONS

Pauly, M., Gross, M., Kobbelt, L.P., Efficient simplification of point-sampled surfaces, Visualization, 2002. VIS 2002. IEEE, Nov. 2002, ISBN: 0-7803-7498-3.* van Kreveld, M.; "Chapter 3. Digital Elevation Models and TIN Algorithms;" 1997; Algorithmic Foundations of Geographic Information Systems; vol. 1340/1997.* van Krevel et al, "Algorithmic Foundations of Geographic Information Systems", pp. 37-41, 1997, Springer, Berlin, Germany.

Lu, W, "Digital Terrain Models", GIM International, Dec. issue, 2001, Amsterdam, The Netherlands.

De Floriani et al, "Multiresolution Models for Toppographic Surface Description", The Visual Computer, pp. 317-345, Springer-Verlag, Berlin, Germany.

De Berg et al, "Computational Geometry", pp. 183-196, 2000, Springer, Berlin, Germany.

Schroeder et al, "Compatable Triangulations of spatial Decompositions", 15th IEEE Visualization 2004 Conference (VIS 2004), Proceedings, pp. 211-218, Oct. 10-15, 2004, Austin, Tx, IEEE Computer Society 2004, ISBN 0-7803-8788-0.

* cited by examiner

● Point
○ Void

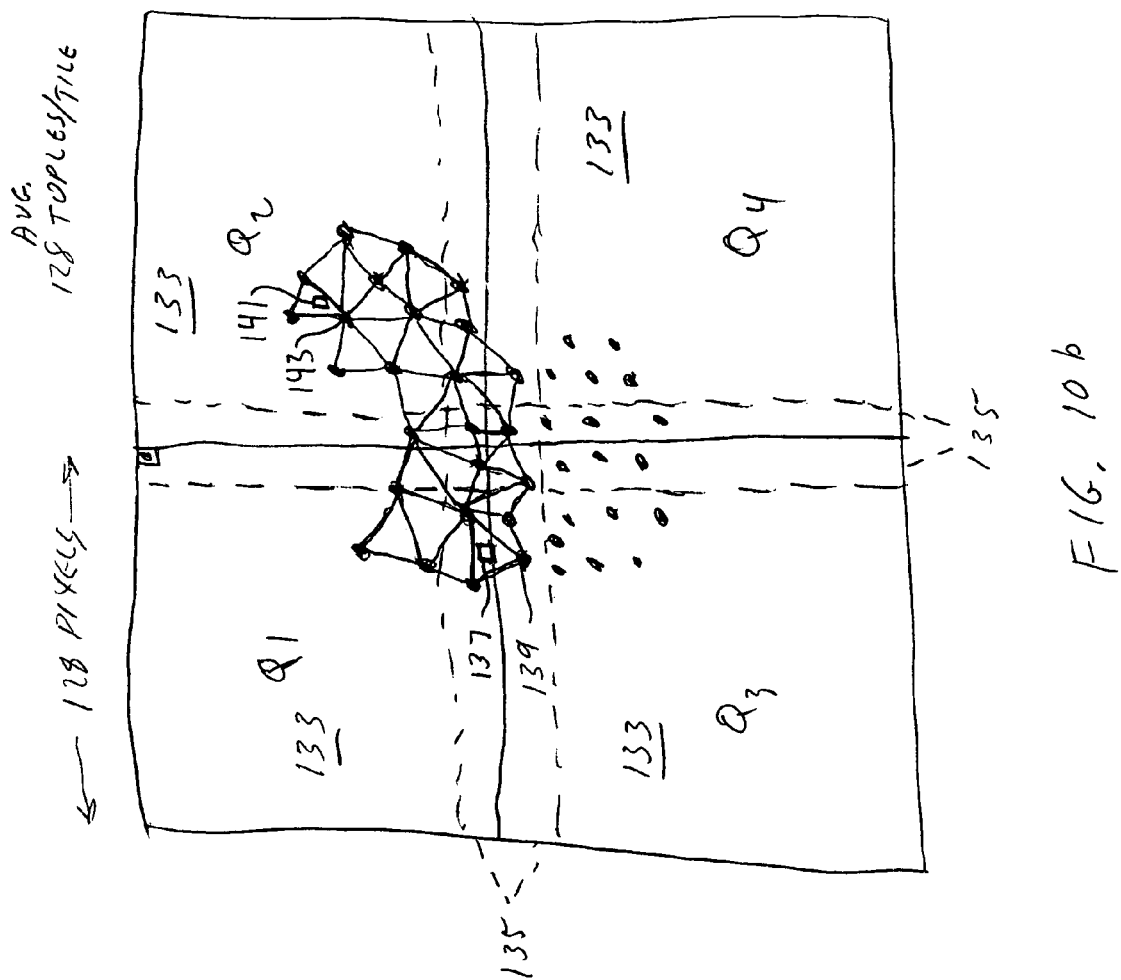

VISUALIZATION AND STORAGE ALGORITHMS ASSOCIATED WITH PROCESSING POINT CLOUD DATA

CROSS REFERENCE TO RELATED APPLICATIONS

This application claims the benefit of provisional application No. 60/609,933, filed Sep. 15, 2004.

FIELD OF THE INVENTION

This invention relates to processing of point cloud data, and particularly to algorithms that allow development of both monoscopic and stereoscopic images from point cloud data employing fast data access of point cloud data.

BACKGROUND OF THE INVENTION

Visualization of three-dimensional data using a variety of two dimensional projections as well as stereo viewing techniques is well known in scientific and engineering communities. Much data exists in a form that has come to be known as point cloud data, and which is obtained as a result of a multitude of discrete point measurements. Typically, such measurements may be taken from an aircraft or possibly a satellite overflying an area and using a beam transmitter, such as radar, lidar or other scanning equipment, for generating a beam that will develop one or more returns back to the transmitter upon striking a surface beneath the aircraft or satellite. Such equipment is conventionally available today, and is computerized so that information related to attitude and altitude of the aircraft is automatically embedded into the point cloud data recorded by the scanning equipment. The instant invention provides new algorithms and techniques for converting point cloud data to a variety of raster images for analysis and visualization, as well as methods for accessing point cloud data faster than has hitherto been possible.

One specific application area is in processing data from laser range finders, also known as light detection and ranging (LIDAR), or laser detection and ranging (LADAR) devices, although the novel techniques disclosed herein have general applicability to point cloud data from other sensors or data generated by manual surveys or other techniques. The term "point cloud data" generally refers to data organized such that one or more spatial coordinates, or locations, of each measured point in a point cloud are included along with other data related to that point. Such other data may include, by way of example, range, temperature, light intensity and any other parameter that may be developed from a beam return. Such a grouping of data associated with a single point measurement, or return, and which includes location of that point is known in the art as a "tuple". Spatial coordinates of tuples in a point cloud are typically expressed in some appropriate reference system, which may, for example, be Cartesian, spherical, or any of several geodetic coordinate reference systems. As noted, other parameters in a tuple in addition to location may include such items as range, temperature, intensity, or other attributes or parameters associated with that particular spatial location under measurement. For example, a one-dimensional data tuple organization for a wire or rod might include data elements as represented by fields shown in Table 1:

TABLE 1

| Field Name | Meaning |
|---|---|
| X | Distance as measured from the origin |
| T | Temperature |
| p | Density |
| K | Conductivity |

This example would be a 4-tuple in that there are 4 values per data tuple sample or measurement. Note that for each tuple, a spatial component, or location where the measurement is taken along the wire or rod is included (X, in the example above) and is not required to be uniformly spaced along the wire or rod as would be the case in a raster or other similar system. As shown in FIG. 1, 2-dimensional gridded raster data 10, such as would be obtained from a CCD array or other scanning system wherein data is collected along uniformly spaced points, is contrasted with quasi-random point cloud tuple data 12 that has no uniformly organized arrangement. In this example, a temperature measurement is included with location measurements. Thus, as an advantage of point cloud analysis, it should be apparent that when dealing with a point cloud containing point cloud data tuples, only data associated with each tuple is computationally considered, rather than having to consider "empty" or meaningless tuple locations from every point in a field of tuples, such as found a raster system, CCD array or other such 2-dimensional fields wherein data points therein are arranged in a predetermined manner. Note that while a two dimensional example is used here, the general discussion applies to any dimensionality of data. In addition, gridded data need not be necessarily spaced on a linear, uniform axis. It is only necessary that an a priori method exist to map numerical data to respective sub-sets of its dimensions. This is commonly seen in gridded data where one or more of the axes are logarithmic. Notice in FIG. 1 that X, Y spacing of points in a grid 10 is assumed, due to grid organization, and thus it is not necessary to store actual <X, Y> coordinates for each point. In this system of gridded data relating to temperature, it is only necessary to store the temperature (<T>) value at each measured point in the grid. In point cloud data, spatial organization of the data is not uniform, and therefore it is necessary to store X and Y coordinates, along with Temperature, for each measured point, resulting in three-tuples containing data <X, Y, T>. It is thus apparent that gridded data have an advantage in storage efficiency whereas point cloud data have the flexibility of non-uniform spacing.

The instant invention is concerned primarily with point cloud data tuples having 2 or 3 spatial locations, and in some instances a time dimension, although some algorithms of the instant invention can be applied to data with other spatial dimensionality. Algorithms disclosed herein can carry along any number of attributes for each tuple in addition to spatial, and possibly time coordinates. In the 1-dimensional example above (Table 1), there is a single spatial dimension (X) and three attribute fields (T, p and K). In this discussion these data are considered to have one spatial dimension.

Spatially unorganized data for a volume and containing tuples comprising 3 spatial coordinate locations and optionally a time value along with associated attribute fields are often referred to as "point clouds" when the tuples are considered to be of infinitesimal spatial extent, or "voxel (Volumetric Cell) clouds" when the tuples are considered to have finite spatial extent. This nomenclature arises from the fact that the data are usually (although not necessarily) spatially irregular and spatially unorganized. An example of this sort of data could be that derived from a lidar or other laser scanner at an altitude and being used to collect information about the surface of the Earth. A table of possible data collected therefrom depicted in Table 2.

TABLE 2

| Field Name | Meaning |
| --- | --- |
| X | X distance from the origin |
| Y | Y distance from the origin |
| Z | Z distance from the origin |
| T | Time of acquisition of the point |
| R | Reflectivity of the laser pulse |
| C | Surface classification |
| N | Return number |
| S | Total number of returns for this pulse |
| M | Mirror angle of sensor |

This example is not meant to be inclusive of every laser or beam scanning system, but rather is used to point out differences between tuple organized data and a typical raster organization. The important differences are that the tuple organized data are usually irregular in their spatial organization and typically carry significantly more attribute fields than do data associated with points in a typical raster image. However, it must be recognized that the algorithms and techniques of the instant invention apply also to the degenerate case in which the tuple or point cloud data are uniformly spaced.

In discussions and developments that follow, the general term "point cloud" is used to refer to tuples of data that carry information regarding their spatial locations. The term "raster" or "uniform raster" is used herein to refer to data tuples in which one or more of the spatial coordinates are predetermined via some a priori organization and thus are omitted from the tuples themselves. Hybrid data tuples where the <X, Y> coordinates are not stored, but the <Z> coordinate is stored, are considered to be raster data.

Common Techniques of Visualizing Spatial Tuple Data

There are a number of prior art techniques for visualizing and manipulating point cloud (spatial tuple) data, these techniques being embodied in quite a number of commercial and non-commercial software visualization tools available today. General approaches in use today are rasterization viewing, point cloud viewing, surface model viewing in two dimensions, and stereo visualization of orthophotos that have been generated from point cloud data. Stereo visualization of an orthophoto requires the additional step of rendering a stereo mate to the orthophoto using a synthetic camera position. In contrast, Applicants generate stereo pair imagery directly from point cloud data as a single process.

Rasterization viewing from point cloud data is developed by converting non-uniformly spaced point cloud data into a uniform raster rendition. To accomplish such rendition, a variety of techniques may be employed, with a simplest technique being to superimpose non-uniform point cloud data over a grid of appropriate spacing and 'poke' point cloud data into the grid. Here, location of data in each tuple is used to determine where the other, measured data in the tuple is to be inserted into the grid. For example, if one had a four-tuple of (X, Y, Z and T) where T is temperature, then a visual rendition might be a 'stack' of raster images, with each layer of the stack corresponding to a range of Z. The temperature value T is 'poked' into a raster grid intersection closest to the tuple X, Y values, and may be depicted as an intensity representation.

A large number of variations of this technique are possible with gray shading and color being used to represent an attribute or dimensional data.

Point cloud viewing of the prior art is usually some variant of projecting three dimensional data onto a plane using a projection algorithm and then displaying this projection on a computer monitor, with attributes such as color, point size, rendering style and so forth being used to visualize attribute data.

Surface modeling of the prior art involves changing the nature of data through a rendering algorithm. For example, 3-tuple data that represents simply X, Y and Z location values can be rendered as contour profiles and displayed in a two dimensional rendering such as a computer display or a paper contour map.

Stereo visualization involves presenting data to a user through some interface mechanism such that a slightly different perspective of the data is individually presented to the left and right eyes. A result is a perception of depth by an observer, simulating normal human binocular vision. A general approach to stereo visualization, as depicted in FIG. 2, is to process three dimensional information 20 into a pair 22, 24 of two dimensional renditions, one (22) perspective for observation by the left eye and a second (24) from a slightly different perspective for observation by the right eye. Such a set of images is typically referred to as a "Stereo Pair." A variety of different approaches have been developed for viewing these stereo pairs. A familiar example is a classic ViewMaster™ toy in which two images each from a slightly different perspective are presented individually to left and right eyes of an observer by an optical-mechanical binocular viewing device. A second simple example is rendering two separate images in different colors and then observing the images through a pair of glasses containing lenses or filters made of two different color films that transmit information from the desired image to the desired eye (anaglyphic stereo). More complex examples of stereo viewing are active computer systems that use a headset or goggles implement a form of dynamic polarization to alternately occlude right and left eyes of an observer as images on a computer monitor are synchronously switched between a left image and right image, respectively.

BRIEF DESCRIPTION OF THE DRAWINGS

FIG. 10b is a graphic illustration of a tiled overlapping triangulated irregular network of the instant invention.

DETAILED DESCRIPTION OF THE DRAWINGS

Figure 1A:
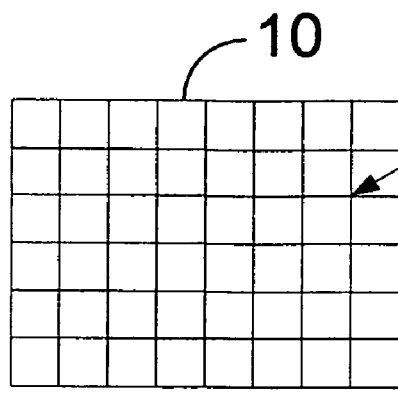
FIGS. 1a and 1b compare gridded and point cloud data structures.
Figure 1B:
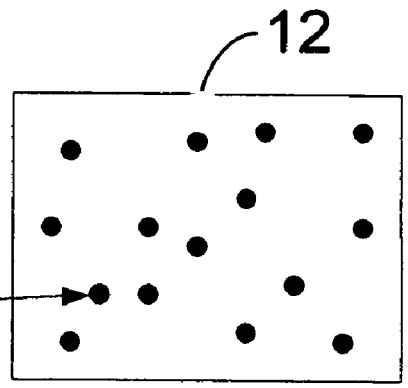
Figure 2:
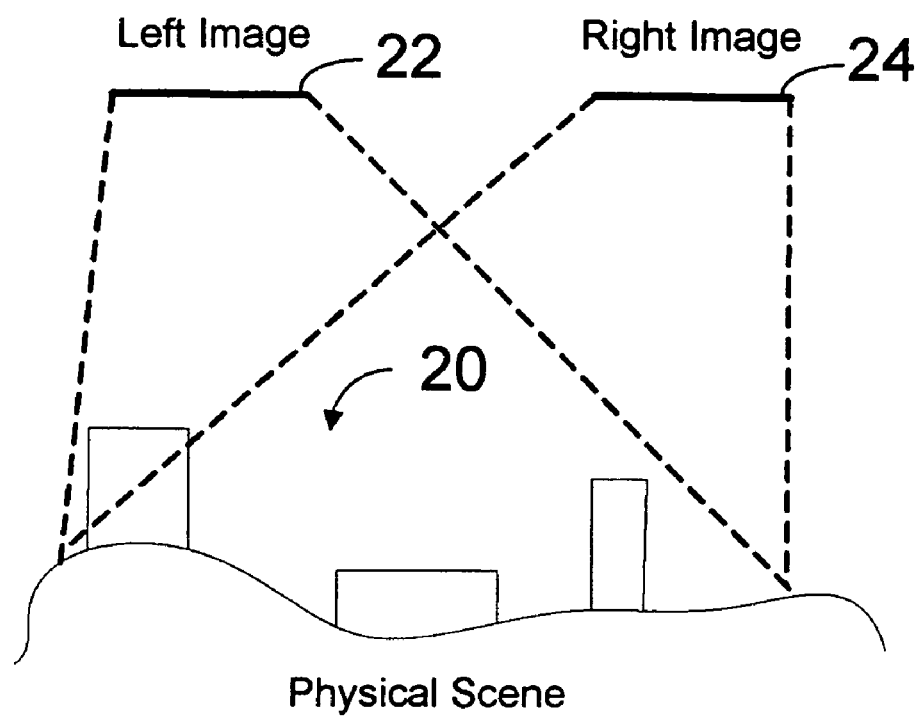
FIG. 2 is a diagram representing positioning of stereo images.

The instant invention encompasses a variety of techniques for visually rendering two and three dimensional, spatially unorganized point cloud data, such as that collected by Light Detection and Ranging (LIDAR) systems typically mounted to and operated from aircraft, into forms suitable for viewing in commercial off-the-shelf monoscopic and stereo visualization systems. While innovative techniques of the instant invention are described herein in a context of LIDAR data, Applicants' general processes and algorithms may be applied to any form of point cloud data.

Throughout the sections that follow, spatial dimensionality of point cloud data is referred to as "dimensions". Point cloud data considered herein can include any additional attribute data, including time. Thus, a point cloud data tuple containing X, Y, Z dimensions and any number of other attributes is referred to as 3 dimensional point cloud data. This distinction is emphasized because some authors include non-spatial attribute data in the dimensionality count. Also disclosed herein are several novel techniques to convert three dimensional point cloud data into two-dimensional images. Such techniques are useful for a number of analysis scenarios. Each of these is described in the following sections.

Nyquist Coverage Image

Nyquist sampling criteria basically states that if an analog signal that has been digitally sampled is to be accurately reconstructed from its samples then the signal must first be band-limited and then sampled at twice the high frequency limit of the band limiter. This technique of sampling is perhaps most commonly seen in the production of recorded music Compact Discs (CDs). In production of a music CD, analog sound to be recorded is first filtered with a low pass filter that limits the highest passed frequency to about 20 Kilo Hertz (KHz). This band limited analog signal is then sampled at 44,000 samples per second. It is each of these two streams (one for each of two stereo audio channels) that are subsequently recorded to a CD. Sampling theory assures us that the band-limited analog signal can be exactly reproduced from the digitized samples.

In the instant invention, these concepts are applied in analysis of point cloud data where the point cloud data represents an entity that exists in the physical world. For example, in the aforementioned example of LIDAR point cloud data, the analog signal may be considered to be a continuous surface of the earth. If this surface is sampled at a nominal ground sample distance of 1 meter, and if it is assumed that a band limit filter process existed in the airborne system such that the analog surface were pre-filtered commensurate with the sampling rate, then, according to Nyquist sampling criteria, an accurate surface model of 2 meter resolution may be reconstructed from the sample data. Such filtering does in fact occur in at least some data collection systems, as is known to those skilled in the art.

A problem encountered with data collected in a non-uniform manner, such as typically seen in point cloud data, is evaluation of conformance to Nyquist sampling criteria. This problem may be addressed in the instant invention by constructing a "Nyquist Coverage Image" to measure adherence to sampling criteria. Presented below are two different implementations of these Nyquist Coverage images, although others could be generated as well.

It is to be understood that the following algorithms, when used in particular sequences, lead to development of highly accurate monoscopic and stereoscopic images from point cloud data and from which physical measurements of ground features may be taken. Other uses of these algorithms may be as a "toolbox", or a collection of algorithms that may be separately applied or combined in any manner to develop raster images or images used for analysis.

Nearest Neighbor Nyquist Coverage Image

Figure 3A:
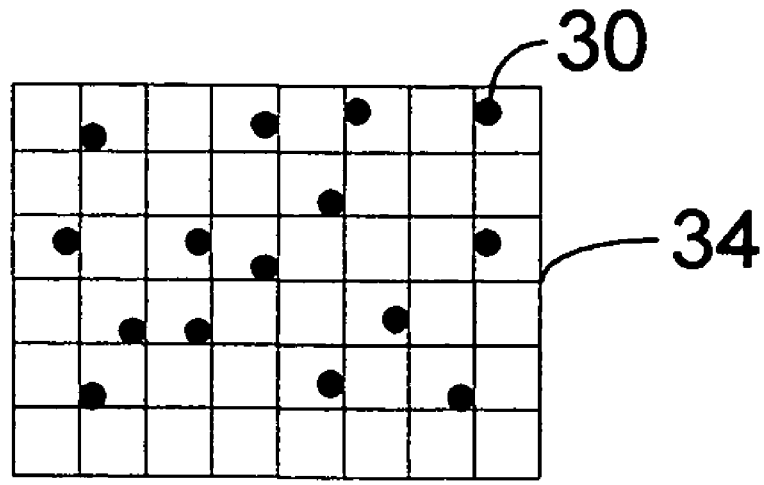
FIGS. 3a and 3b illustrate one method for populating grid intersection data with tuple data.
Figure 3B:
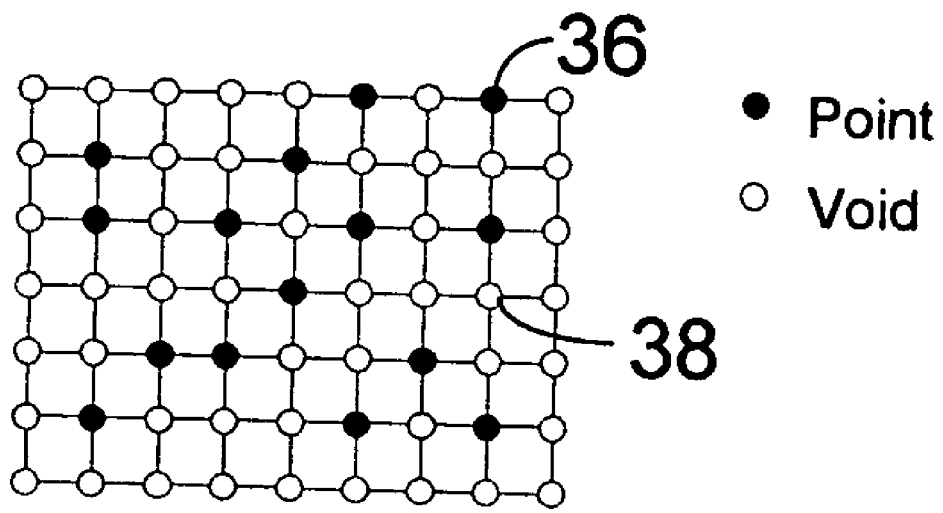

A first algorithm of the instant invention is referred to herein as a Nearest Neighbor Nyquist Coverage Image. This image is useful in determining whether a point cloud, or portions thereof, is sufficiently dense so as to support a desired resolution of a finished image or product. Referring to FIG. 3a, a uniform virtual grid 34, a Nyquist Image Coverage Grid, is constructed with grid spacing at a desired Nyquist Analysis spatial frequency and with sufficient width and breadth to contain a point cloud data set to be analyzed. This grid is superimposed over the point cloud. For example, if one is analyzing for 0.5 meter coverage, then the grid is constructed on a spacing of 0.5 m for the instance where ground data tuples are assumed to have been received at an average spacing of 0.25 m. A data structure associated with the grid is established to contain a variety of information that is adjusted dependent on an analysis task and/or secondary uses for the data. A minimal data set might be simply a single bit in each tuple that indicates presence or absence of a data point in the proximity of a grid location. This can then be extended to any level of detail desired such as point classification, return intensity, height value, aspect, and so forth. A principle concept is associative mapping between tuples of the point cloud and intersections of the Nyquist Image Coverage Grid, as illustrated in FIGS. 3a and 3b. In FIG. 3a, irregularly spaced tuples 30 from the point cloud are shown with respect to the superimposed grid 34. Using an algorithm of the instant invention described below, tuples 30 are subsequently associated with, or "mapped," using a nearest neighbor approach, into nearest intersection points 38 of the Nyquist Coverage Image grid, as illustrated at FIG. 3b. There are a variety of common programming methods by which the grid structure can be implemented. Examples include N-Dimensional arrays (N=2 would be an appropriate configuration for a two dimensional image), linked lists, file-based storage, and the like. The storage method is not critical. Size of the grid is typically adjusted such as to minimize an amount of data storage required. One technique that can be used in a minimization process is to compute a rotation of a minimum bounding rectangle that will encompass a convex hull of a surface generated by a point cloud. Another method could be to overlay a point cloud with a bit map wherein bits of the bit map are set to 1 where data exists and set to zero where no data exists. Techniques applied to efficiently optimize storage requirements for a grid are not critical to the algorithm.

Figure 4:
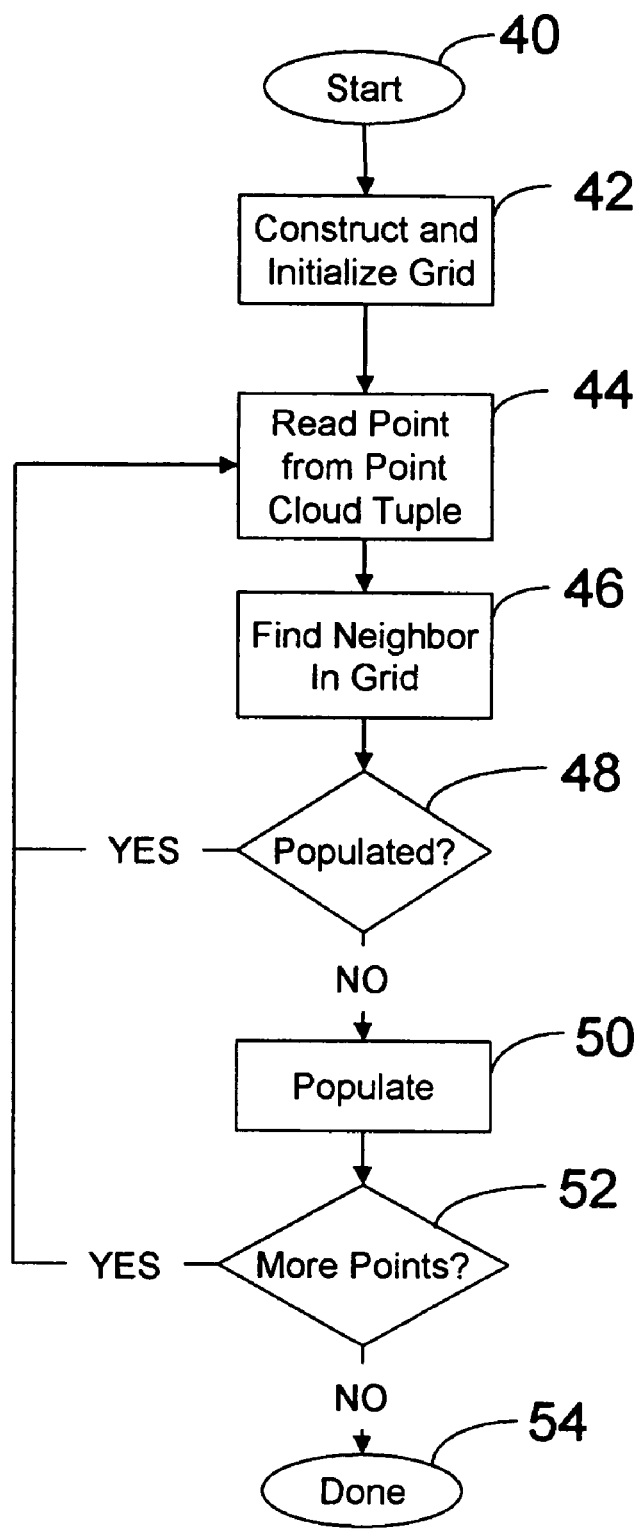
FIG. 4 is a flowchart illustrating how point cloud density may be determined.

Referring to FIG. 4, a uniformly spaced grid created at block 42 has all intersection points initialized to "void.". The exact representation for void depends on the selected method by which the grid is created. For example, in a straightforward grid array construct, zero could be used for void whereas in a linked list structure, a pointer value of "null" could be employed. The method for marking "void" is not critical to an embodiment.

Still referring to FIG. 4, point cloud data are processed one point at a time in a loop starting at block 44. Typically, laser returns from a lidar-equipped aircraft are in the form of a sequential list of tuples that may be tens of gigabytes in length. In this first method, the tuples in the sequential list are stepped through one at a time and X, Y data therein used to determine which intersection of the grid is closest to a tuple under consideration. X, Y coordinates of the tuple under consideration serve to index data in that tuple into a corresponding data structure associated with the intersection nearest that tuple. At block 46, a grid location spatially nearest to the tuple under consideration is accessed in order to populate the grid data structure at that point with the data from the tuple. At block 48, if an intersection point of the grid nearest the tuple is "void" then no tuple from the point cloud has been associated with this intersection. At block 50, the void intersection point under consideration is then populated with data from the tuple under consideration. If, on the other hand, and at block 48, if data from a nearby, previously examined tuple has already populated the grid intersection, then a tuple that is also near that intersection is simply discarded. Thus, data from a tuple that is first mapped into an intersection is the only data retained. This algorithm, in its most direct embodiment, would simply discard the current tuple and loop back to block 44. In this sense, the algorithm may also serve as a thinning algorithm to reduce quantity of data populating a raster image when the point cloud is on average denser than the raster grid. This process continues until all tuples in the entire point cloud have been processed, and at block 52 a NO is returned, terminating the program.

As a result of the above processing, a uniform grid is developed with grid intersections populated by tuple data from tuples proximate respective intersections, with some grid intersections marked "void" where no tuple was proximate. As noted above, the more non-void intersections are produced, the closer the point cloud is to satisfying the Nyquist sampling criteria for the grid intersection spacing. This image can then be either manually reviewed or processed through automated algorithms to make assessments concerning distribution of coverage of tuple data. Decisions are based on these analyses such as to acquire additional data in void regions or to ignore such regions if they are not considered critical. For example, if a map were being constructed of features of a harbor, then voids over water may be considered immaterial to construction of the map. Voids in a Nyquist Coverage Image can be highlighted by rendering them in a color or intensity not used for non-void values within the image. If, for example, in a Nyquist Coverage Image, grid intersections having non-void values were rendered by gray level intensity with a gray level corresponding to the 'strength' of a reflected laser pulse, then grid intersections having a value of "void" might be rendered in a constant intensity color (e.g. blue) to make such points immediately obvious.

For the above and other algorithms disclosed herein, it is noted that during processing, the virtual grid may represent a raster image containing pixels that ultimately are to be displayed on a monitor or used in further processing. As such, when processing is completed, computed values for pixels of the image are either stored in a file (typically, but not necessarily a hard disk-type storage) or displayed on a monitor. In some instances, processing of the entire virtual grid may occur before storage of the pixel values occurs. In other instances, calculated pixel values may be stored one at a time or in groups, depending on available processing capabilities and computer memory. Here, a typical scheme may be to store calculated pixel values in a computer memory cache, and when the cache reaches a predetermined level of fullness or a predetermined number of pixels are calculated then the calculated pixel values are transferred to a hard drive-type storage or other memory storage. In other instances, calculated pixel values may be written directly to a video output device, such as a video card having its own self-contained memory storage. In instances where the number of grid intersections is larger than a number of pixels on a computer display, such as a grid having a number of intersections larger than 1024×768 for an SVGA display, well known scaling or sampling algorithms may be employed to fit the image to the screen and size the image or portions thereof as desired.

Gradated Nyquist Coverage Image

In another embodiment of a Nyquist Coverage Image, referred to herein as a Gradated Nyquist Coverage Image, a color and intensity coded raster image is generated wherein color indicates a degree of conformance to Nyquist Criteria and brightness of color indicates a secondary attribute being presented, such as a LIDAR reflectance intensity. In this embodiment of a Nyquist coverage image, a uniform virtual grid is constructed, and each intersection (representative of a pixel) of the grid considered with respect to distance to a nearest tuple. Typically the grid intersections are stepped through in sequence, but such a sequential stepping is not required. At each intersection, a distance to a nearest tuple is measured, and a pixel representative of that intersection assigned a color depending on the measured distance.

Figure 5:
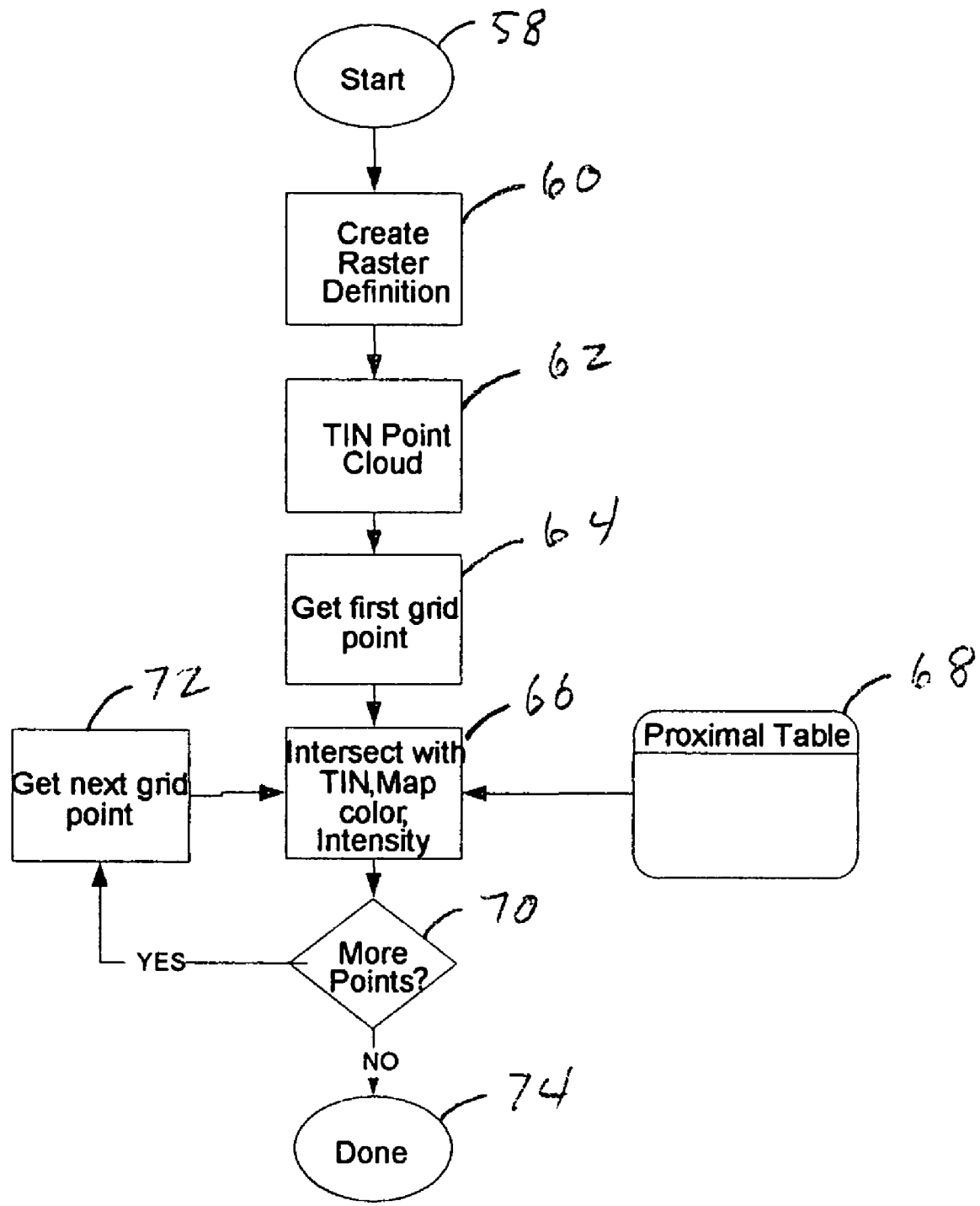
FIG. 5 is a flowchart illustrating another method for determining point cloud density.

Referring to FIG. 5, the uniform virtual grid or "virtual raster" is constructed at block 60 with grid spacing at a desired Nyquist Analysis spatial frequency. For example, if one is analyzing for 0.5 m coverage, then the grid is constructed on a spacing of 0.5 m where data tuples are assumed to have been collected at an average distance of 0.25 m. Also, at block 60, a proximal mapping table is constructed, scaled by the desired Nyquist criteria. This table relates distance from an intersection to the closest tuple, and assigns a color to the pixel representative of that intersection depending on this distance. An example table (Table 3) might be:

TABLE 3

| Distance Range | Color |
|---|---|
| >2.0 m | Red |
| 1.5 m to 2.0 m | Orange |
| 1.0 m to 1.5 m | Yellow |
| 0.5 m to 1.0 m | Blue |
| <0.5 m | Green |

Figure 6:
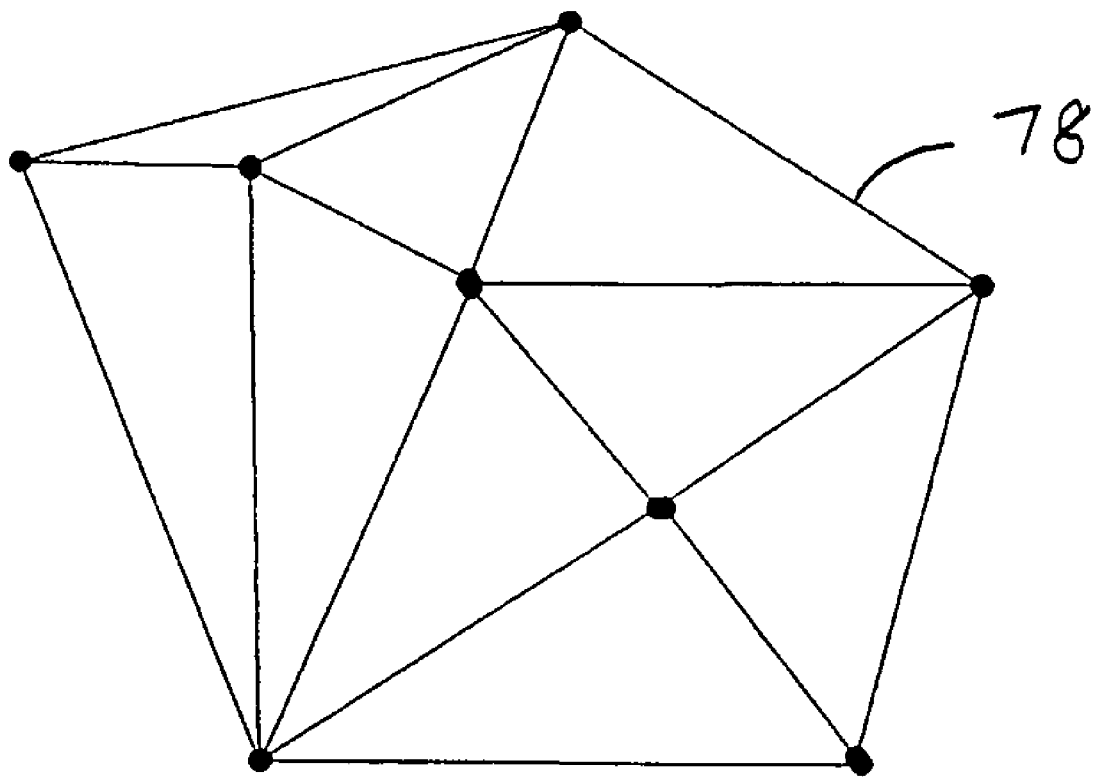
FIG. 6 is a graphic illustration of a triangulated irregular network.

At block 62, a point cloud from which a Nyquist Coverage Image is to be constructed may be rendered as a Triangulated Irregular Network (TIN) or some other data structure that facilitates random interpolations. As shown in FIG. 6, a triangulated irregular network is a set of triangles 78 constructed with point cloud tuples at the vertices of each triangle as illustrated in FIG. 6. A common method of interpolating from a point cloud is to construct a triangulated irregular network and then interpolate from surfaces defined by the resultant triangles. In Applicants method, the grid created at block 60 is superimposed over the triangulated irregular network developed by the point cloud and grid intersections interpolated from the triangle surfaces as described. The following steps are described in terms of a triangulated irregular network, although any interpolation technique can be employed. More information about Triangulated Irregular Networks is provided later herein. Referring back to FIG. 5, beginning at blocks 64 and 66, each intersection of the virtual raster created at block 60 may be stepped through, one intersection at a time. The current intersection under consideration is located on a surface of a triangle of the triangulated irregular network created at block 62. At block 66, a color used to visually render this pixel, or raster point in the virtual raster grid is selected by first computing distance from this raster point to the nearest point cloud tuple (since this example uses a triangulated irregular network, this will be the distance from the intersection under consideration on a surface of a triangle to the nearest vertex of that triangle). Based on this distance, a color for this intersection of the virtual raster grid is selected from the proximal mapping table 3 at block 68.

Intensity of a selected color may be set, or modulated, based on some other attribute that the user wishes to present, such as reflected intensity of a laser pulse. Details of this "modulation" process are presented in the next section. At block 70, if there are more points to process, control branches to block 72, which accesses the next grid point and continues processing at block 66. As noted earlier, the result of the above process is a color coded intensity image with color indicating degree of conformance to the Nyquist Criteria and brightness of color indicating other secondary attributes being presented. Here, just the color information provides an image containing color smudges indicating different densities of tuples. When color intensity of this color image is modulated by intensity of the laser returns that are included in each tuple, further details about the surface emerge. This process is described below.

Modulated Pixel Intensity Image

Figure 7:
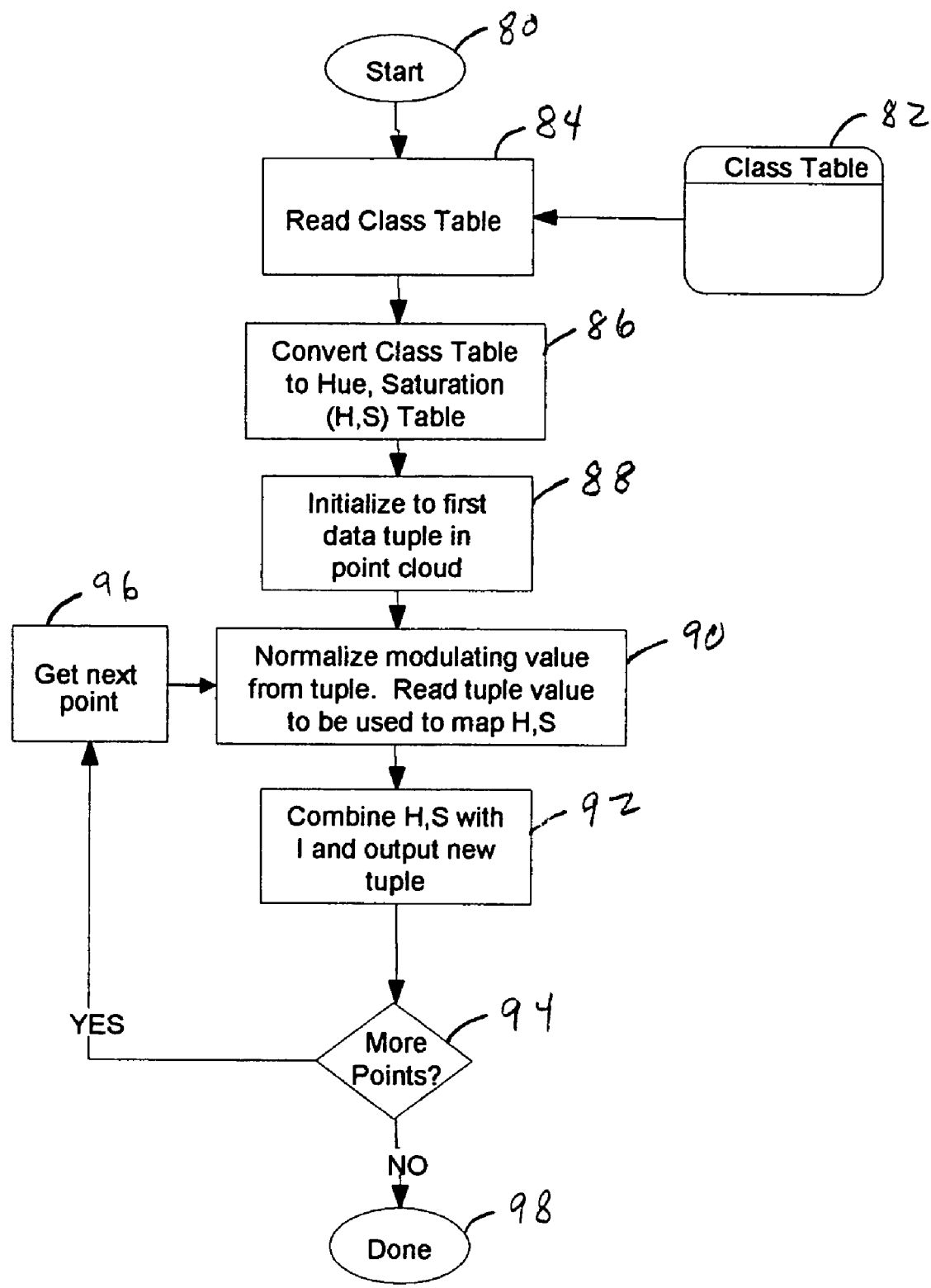
FIG. 7 is a flow chart illustrating how a modulated pixel intensity image is developed.

A feature of the instant invention is the concept of using non-visual information, such as height of a surface feature or intensity of a laser return, to modulate any of the three channels of a color image to provide novel visualization images. A modulated pixel intensity image is a raster image constructed by representing two or more combined attributes by modulating one attribute with a second attribute. For example, as noted above, a color/intensity modulated image comprises an image with one attribute represented by color and a second attribute represented by intensity of the color. Referring to FIG. 7, one might use a class table at block 82 to classify tuples in a LIDAR point cloud by assigning a distinct color to represent a data class. One might use red for buildings, green for foliage, yellow for ground and blue for water. Such data classes are typically manually assigned. One could then modulate these colors with some other attribute, such as a height parameter or an intensity of a laser return for that tuple, scaled to an appropriate range.

One approach to achieving this image is to use a Hue, Intensity, Saturation (HIS) model as the color representation to be manipulated. A two component representation may proceed as follows. Still referring to FIG. 7, a class table at block 82 is read at block 84. Then, at block 86, a fixed collection of Hue and Saturation two-tuples are constructed; one tuple for each distinct value of information to be represented in the model. For example, if eight surface classifications are to be represented then eight distinct Hue-Saturation combinations are generated. In this model, and at block 88, the first data tuple in the point cloud is accessed. Such accessing may be as described above wherein the tuples are considered in the order they are recorded or by stepping through a grid with intersections populated using a nearest neighbor approach. Next, at block 90, an Intensity value is filled in for the hue-intensity-saturation value from the second attribute to be visualized. In this example of surface classification, Intensity might be derived from an elevation value in the tuple or an intensity of a laser return pulse. The value used in deriving intensity is normalized at block 90 to fit the HIS model. At block 92, the Intensity value under consideration is combined with hue and saturation values to create a new tuple representation where hue-intensity-saturation parameters are added to the data in the original spatial tuple (this is conceptual, the hue-intensity-saturation may be used in generating a new, reduced order tuple for visually rendering the Modulated Pixel Intensity image without ever physically storing the tuple). In this instance, only tuple data necessary to develop an image may be used. By repeatedly branching at block 94 to loop over all raster points, the visualization image is now constructed by mapping the desired spatial coordinates of the tuples (usually a X,Y of X, Y, Z) to form a uniform raster image. If necessary, at block 92, the hue-intensity-saturation values are converted to parameters required by a visual rendering output device (a computer display will typically require pixel data to be represented as Red-Green-Blue three-tuples whereas a printer may be able to directly accept data in hue-intensity-saturation format).

It is not necessary to render the modulated pixel image into a uniform raster. The modulated, unordered data can be directly visualized using 3D viewing tools without resorting to mapping the spatial elements of the data to a uniform grid.

Modulating an intensity channel of a hue-intensity-saturation data representation from some other source is known in the art. For example, generating a high resolution color image using hue and saturation channels from low resolution color images and the I channel from a geometrically co-registered panchromatic image is a well-known technique in the industry referred to as "pan sharpening". The innovation of the instant invention uses non-visual information to modulate any of the three channels in a color image to provide novel visualization images.

Although the example above describes modulation using a hue-intensity-saturation color space model, the instant invention is not limited to such models. Any color space model may be used in constructing the modulated data.

Hierarchical Raster Renderings

Figure 8:
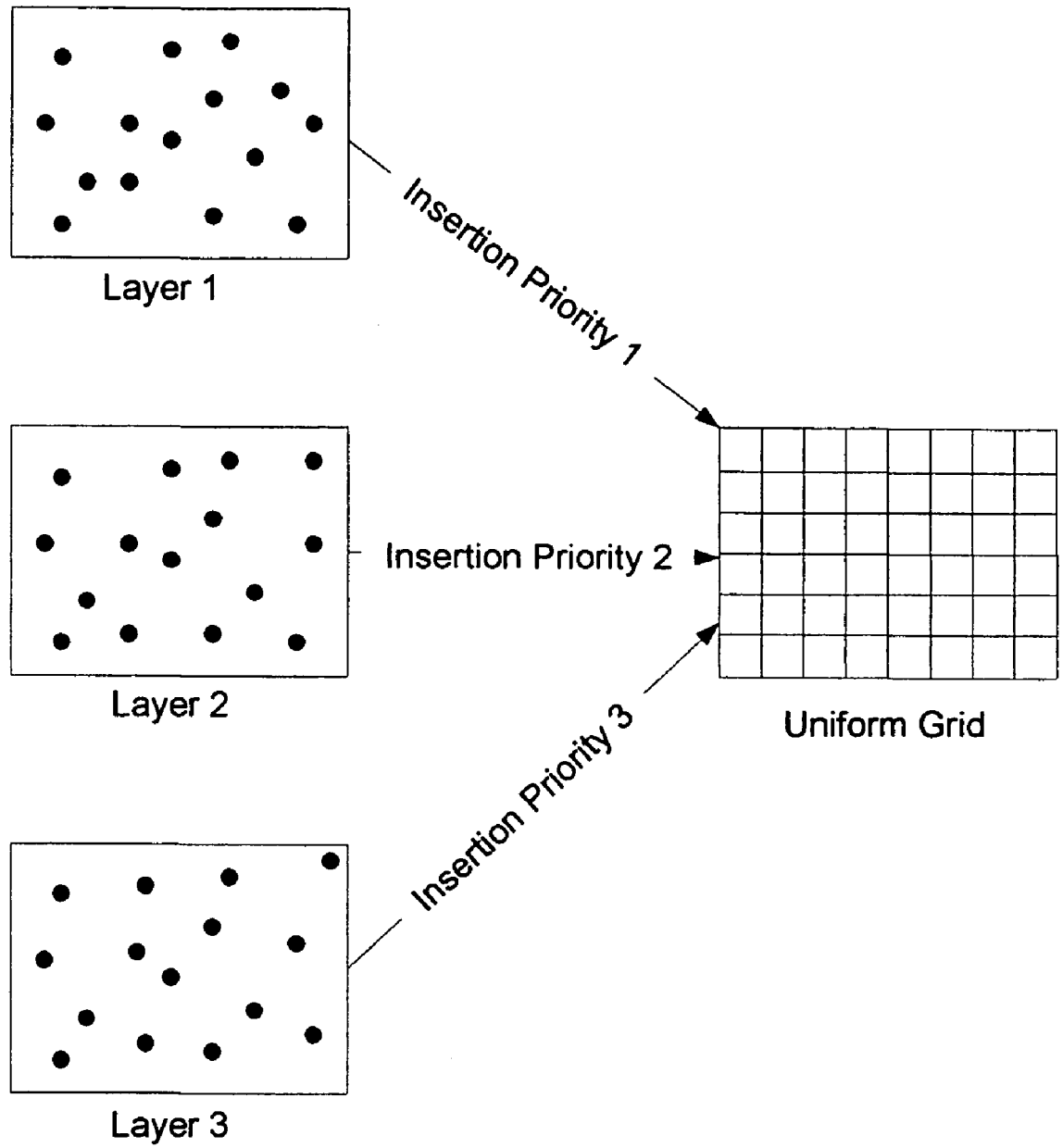
FIG. 8 is a graphic illustration of priority attribute mapping.

As a feature of the instant invention, the concept of hierarchical raster renderings is provided. Hierarchical raster visual renderings are uniform gridded raster models of point cloud tuple data created using a priority insertion method with the goal of enhancing visualization of selected attributes of the tuple data. For example, only selected features, such as roads, are seen or enhanced. As above, the tuple data may be accessed by reading the tuples in order from a file or by stepping through a grid. The hierarchical raster rendering process creates a visually rendered image that reveals mapped tuple attributes in a specified priority scheme. For example, assume an assigned priority scheme of void=0, vegetation=1, ground=2, where 2 is a higher priority than 1. For this mapping, a pixel of the resultant image is represented as ground unless no ground attributed tuple intersected or was sufficiently close to an intersection of a grid that developed the image. Where there is no ground attributed pixel near an intersection of the grid, then vegetation is represented. In the case where neither a ground or vegetation pixel is near a grid intersection, then a void pixel is represented. This method is pictorially represented in FIG. 8 with the algorithm flow chart given in FIG. 9.

The overall concept of Hierarchical Raster Renderings is another aspect of the instant invention. One method or process of creating a Hierarchical Raster Rendering is described below but it should be recognized that other techniques for creating Hierarchical Raster Rendering are possible using standard rasterization techniques. One implementation of Hierarchical Raster Renderings (HRR) may proceed as follows:

1. Select or define attributes that are to be measured and a mapping scheme within which tuple data is to be inserted. An example in the case of LIDAR data might be a tuple classified as having been reflected from a particular class of surface (ground, building, low vegetation, high vegetation, etc.). Such classifications may be manually entered as discussed above, and which are well known in the art. A specific color could be assigned to each class of surfaces. In addition, several additional color mappings might be included, such as void and unclassified (unclassified meaning that a point exists but has not been manually assigned a surface material class).

Figure 9:
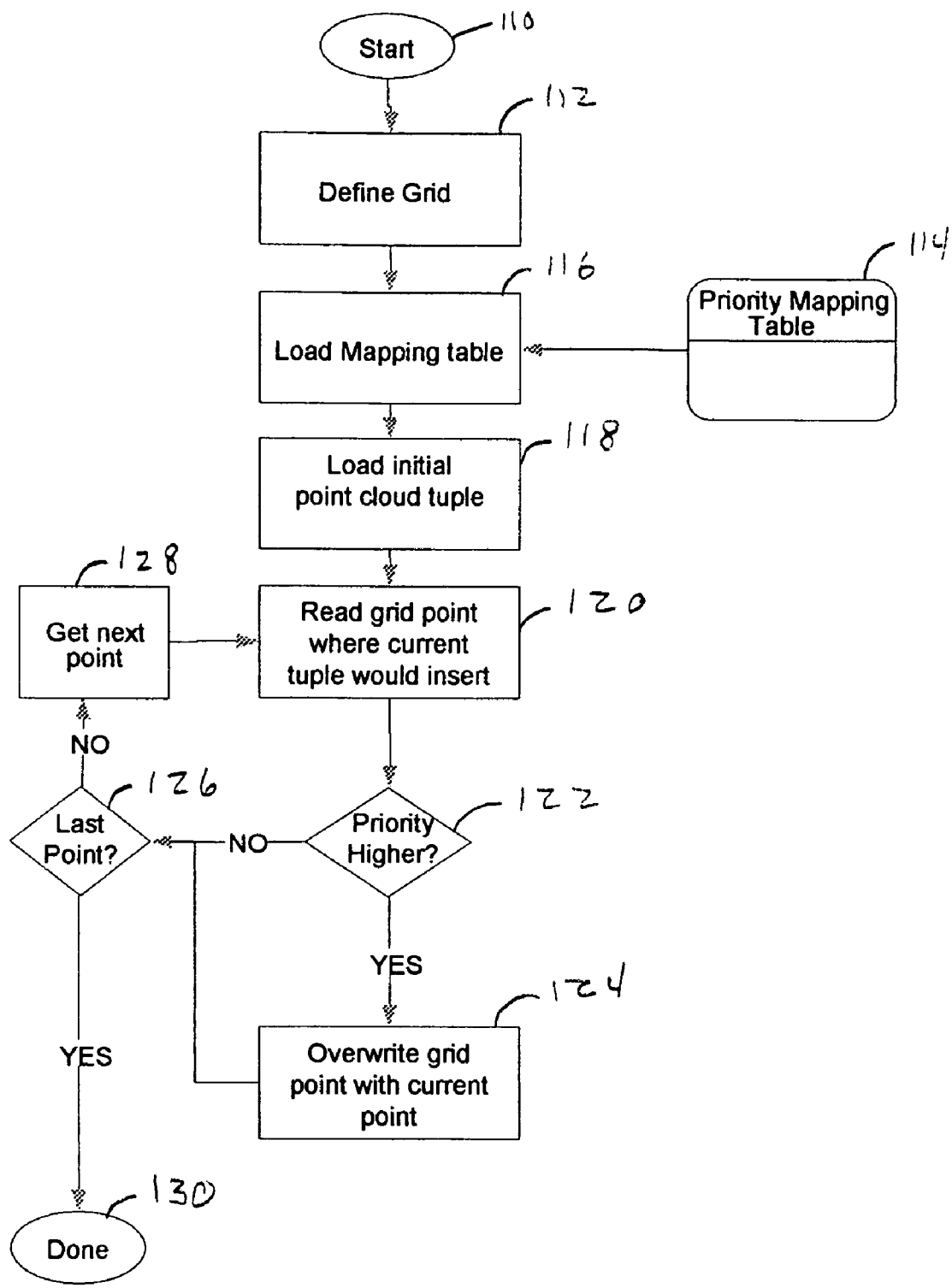
FIG. 9 is a flowchart illustrating how priority mapping of tuples is implemented.

2. Specify a stacking order, or priority order, of the classifications, with 0 being a lowest priority and proceeding upward. The mapping scheme and stacking order are specified in a priority mapping table 114, as illustrated in FIG. 9.

3. Develop a raster grid (block 112 in FIG. 9) into which the prioritized tuple data will be inserted. The point spacing of the grid need not be the same in X and Y directions. Also, the point spacing may be similar to an average sample spacing of the data to be mapped or it may be substantially different, depending on visualization goals. The grid points are initialized to a value unrelated to the mapping set of values described in the previous steps. For example, an initial value of zero might be reserved to indicate a grid intersection into which a data point has never been mapped ("void").

4. After loading the Priority. Mapping Table at block 116, the algorithm then passes through the point cloud tuple data, beginning at block 118, and, at block 120, finds the proper location to insert the selected values into the grid. The insertion algorithm can be a proximity insertion wherein a tuple closest to a grid intersection is inserted, as described above, or can use some indirect method of mapping tuples to the grid. A result of this step is a mapping from a tuple to a grid intersection. It is important to note that this mapping is typically many-to-one; that is, one or more tuples to a single grid intersection. Here, where several tuples are proximate a grid intersection, the highest priority tuple is mapped into the grid intersection. This many-to-one mapping occurs as a result of the generally non-uniform spacing of the tuples.

5. The grid is populated based on a comparison at block 122 of the current value in the grid and a priority value of the data to be mapped from one or more tuples associated with a respective intersection. If the new tuple data priority exceeds a priority value of current data resident at a grid intersection, the tuple data at that grid intersection is replaced at block 124 with the new, higher priority tuple data value. If the new tuple data is of a lower priority value, the new tuple data does not replace the grid data, and control continues to block 126 where the query is made as to whether the just-examined grid intersection is the last intersection. If the answer is no, then the program loops back to examine the next grid intersection at block 128. It is important to note that data being inserted into the grid is not necessarily a single parameter or field such as intensity or color. A complete, multi-field data structure may be inserted at populated grid intersections, or only a portion of the data may be inserted. The choice of the field value to be used in subsequent visualization of the grid may be made by the display software or in a subsequent processing algorithm. Where, at block 126, the last point in the grid has been examined, the program ends at block 130. As noted, the above process provides a rendered image that reveals mapped attributes in accordance with the specified priority scheme. Renderings of these types are very valuable for synoptic analysis of the coverage and classifications of point data. Such renderings can also combine multi-analysis information within the same rendering. The example just mentioned can provide both a ground surface model as well as a Nyquist Coverage Image.

Fast Access Data Formats

Another feature of the instant invention includes two different formats for ordering point cloud data. These formats provide methods of rapidly accessing either original data tuples or interpolation models of the data tuples.

A Tiled, Organized Point Cloud Model (Top)

Many actions associated with using data organized as point clouds of data tuples require rapid spatial access to the data and/or interpolation of values between tuples. A variety of methods exist today for rapid access of a point cloud (for example, a spatial quad tree organization) or for interpolation between tuples, such as the aforementioned continuous Triangulated Irregular Network, or TIN. Another feature of the instant invention is to combine elements of a gridded indexing system, such as a quad tree or some other regular indexing structure, with an interpolation method such as the triangulated irregular network. This approach and model is unique in that it is segmented into fast-access-format tiles of data that each have an edge redundancy mapping scheme to allow algorithms to process from a single fast-access-format tile, allowing for example, rapid generation of a raster image interpolated from point cloud data. This model is referred to herein as the Tiled Organized Point Cloud Model (TOP), illustrated in FIG. 10a and described further below. Such a model facilitates general high performance processing of large volumes of point cloud data.

A tiled organized point cloud model can apply to data tuples having 1, 2 or 3 dimensional data as well as time data. The example herein illustrates construction of a 2 dimensional tiled organized point cloud model, but the same principles and similar algorithms are easily applied to other dimensions as well.

Figure 10A:
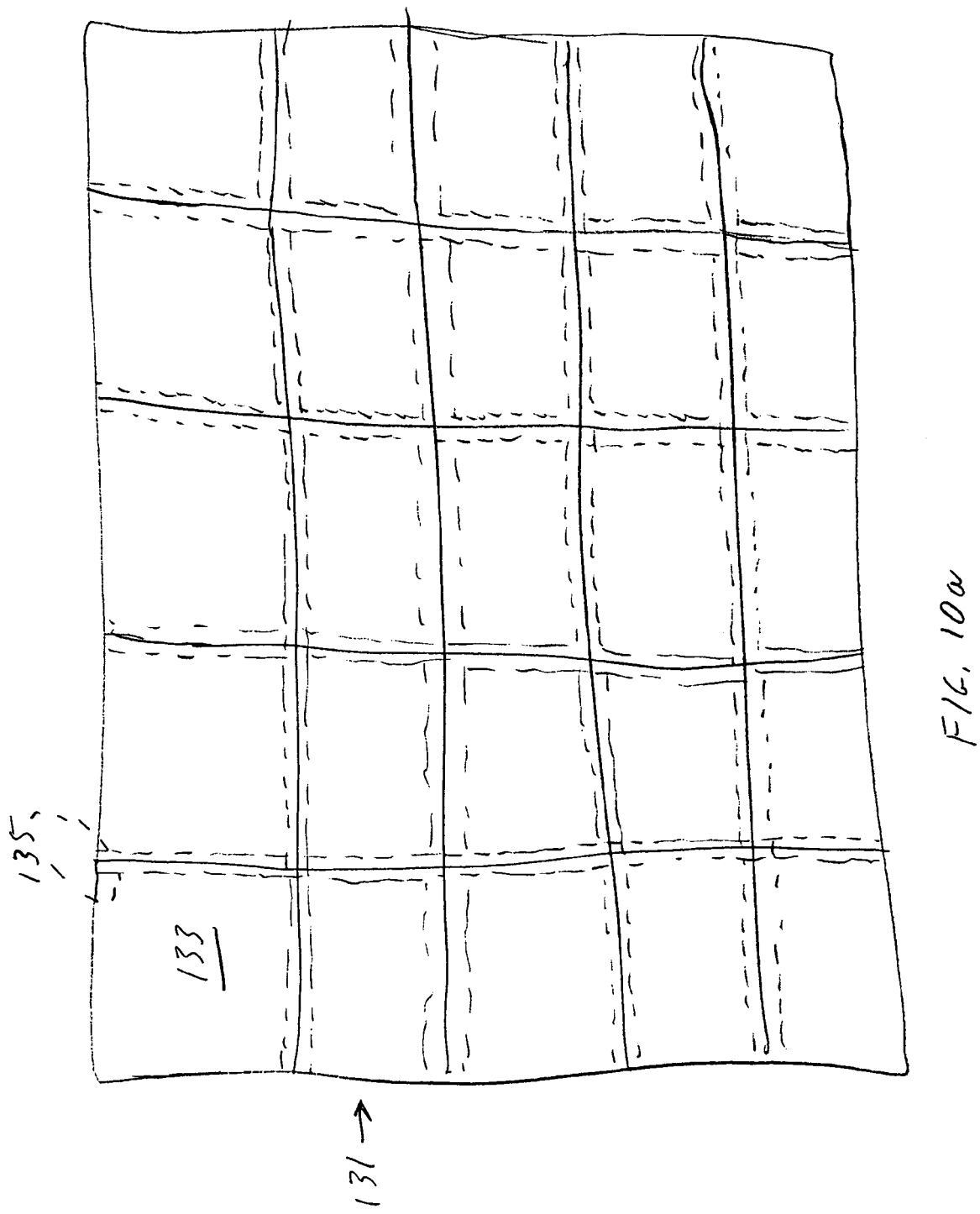
FIG. 10a is a graphic illustration of a tile grid with overlap regions.
Figure 11:
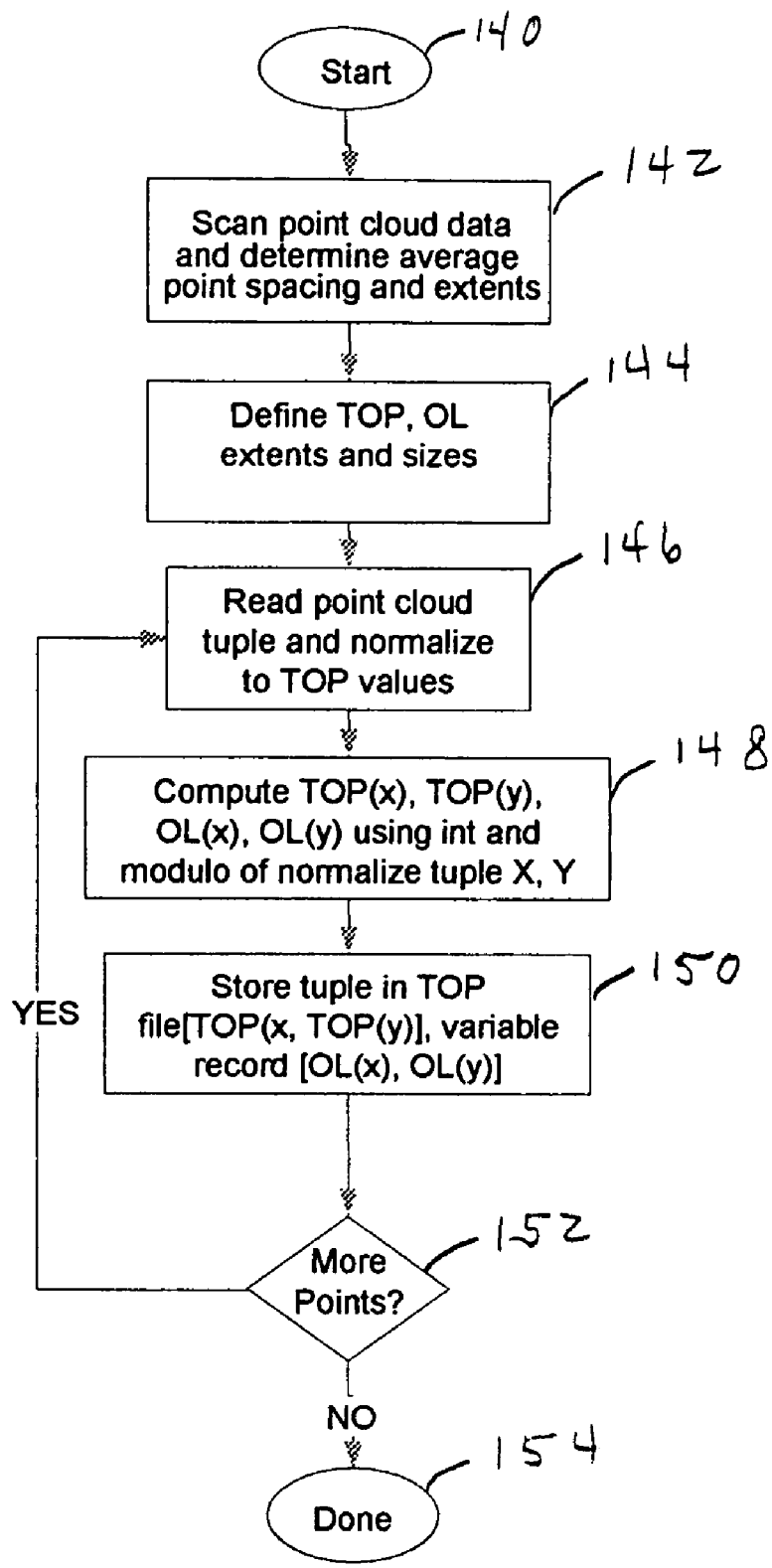
FIG. 11 is a flowchart showing how tiled organized point cloud data is generated.

One example of a tiled organized point cloud model may be constructed by a number of different algorithms. One approach for point cloud tuples consisting of spatial elements of x, y and z that are to be rapidly accessible in the X and Y dimensions (sometimes referred to as a 2½ D data structure) is illustrated in FIG. 11 and described as follows. Referring to FIG. 11, the point cloud is sampled at several locations at block 142 to determine an average distance between tuple points and their nearest neighbor points in X and Y dimensions. The point cloud is also examined to determine the X, Y extent of the point cloud in whatever coordinate system the point cloud is arranged. Henceforth coordinates of all tuple points will be considered to be in the coordinates and units of measure of the point cloud unless stated otherwise. Also at block 142, a virtual grid is constructed encompassing the point cloud and which represents a minimum bounding rectangle of the point cloud. Referring to FIG. 10a, a grid 131 is shown wherein each subrectangle 133 in the grid is referred to as a tile, each tile 133 occupying a small portion of the grid. For example, grid 131 may have 10 tiles 133 on each side for a total of 100 tiles. The grid may be rotated to reduce its footprint. Nominal spacing between intersections in this grid is typically defined to be some convenient multiple of the average distance between tuple points as determined from the sampled portions of the point cloud. The grid spacing in an X dimension need not necessarily be the same as the grid spacing in the Y dimension. The grid spacing determines an average number of point cloud data tuples that will occupy each virtual grid tile. This is referred to as the tiled organized point cloud tile size.

At block 144 (FIG. 11), grid 131 of FIG. 10a of the previous step may be further subdivided to a size that corresponds to an amount of virtual overlap 135 desired between each of tiles 133. This subdivision must be a sub-multiple of the tile size. For example, the tile size may be selected to be 1,024× 1,024 units and the overlap size to be 64 units. As such, and as shown in FIG. 10a, 64 units are common along boundaries of adjacent tiles. These overlap subdivisions are shown in dashed lines, and designated Overlap (OL) tiles. Overlap tiles are not actually constructed outside of a tiled organized point cloud tile—the overlap is created on-the-fly as needed. Thus, in embodiments where use of the overlap tiles are not needed, they simply would not be created. Also at block 144 (FIG. 11), a file format (virtual or physical) for each tile is defined with variable length records. A header for each variable length record, and thus for each tile in a tiled point cloud file, must contain enough information to permit an application fast access to the data in a tile. One implementation would require the following header information, as illustrated in the following table 4.

TABLE 4

TileSizeX - width of tiles
TileSizeY - height of tiles
GridOriginX - upper left corner of first tile
GridOriginY - upper left corner of first tile
NumRows - the number of rows of tiles
NumColumns - the number of columns of tiles
TileLengthOffsets - Array of tile length offset
Structures in row major order. There are exactly
NumRows * NumColumns entries in the array.

Each TileLengthOffset structure would contain the following information:

Length—number of points in this tile

Offset—number of points in file prior to the beginning of this tile

The above information is all that is needed to determine the footprint of a tile or to determine the tile(s) that are needed for a particular area. Once a tile number is known, the points or tuples for that tile can be read from a file by seeking to the Offset for the tile, then reading Length number of points. Overlap tiles are merely a special case of the tiling method as described above. A grid structure for overlap tiles is much finer, resulting in more and smaller tiles. The header information shown above could be used to navigate to and select overlap tiles as well. A file format for tiles and overlap tiles will have (X/OL)*(Y/OL) variable length records. In the example of the previous step, both X and Y dimensions of the tiled organized point cloud are set to 1,024 and the overlap size set to 64. Thus this example would have (1,024/64)*(1,024/64)=256 variable length records, which as stated may be used to retrieve or access data for a single discrete tile or overlap tile. This organization is advantageous in that only one variable length record needs to be accessed in order to identify a respective tile to be considered.

5. The point cloud data is now processed at block 146 into the tiled organized point cloud configuration. For each tuple in the point cloud, its X and Y value is used at block 148 to directly determine which variable length tile and overlap tile to access for storage of the tuple data at block 150. A branch at block 152 loops back to block 146 until all points of the point cloud ensemble have been processed.

A tile organized point cloud configuration as described provides access to data through a set of Input/Output (IO) routines that can efficiently access the point cloud data at the granularity of an overlap tile. Note that due to the non-uniform distribution of the point cloud data, each overlap tile will contain a variable amount of tuples, thus the need for variable length records. As such, data processing requirements for processing point cloud data that is arranged in Applicants tiled organized point cloud format are reduced, as only a single tile and its overlap tiles need be accessed in order to retrieve point data at a given XY location. In some instances, and as also noted above, in instances where the overlap tiles are not required, they are not generated. The tiled arrangement and file header layout as described is useful to provide fast data access to portions of interest of the point cloud. One may also construct Reduced Resolution Data Sets (RRDS) from the original tile organized point cloud, building a separate set of tiles for each "level' of reduced resolution data sets. Various well-known thinning algorithms can be applied to the original tile organized point cloud data to construct the reduced resolution data set levels.

A Tiled, Overlapping Triangulated Irregular Network

As one example of an algorithm that would benefit from a tiled organized point cloud model, and as yet another feature of the invention, it is often necessary in rendering algorithms to access a random location within a point cloud. Since point cloud data tuples exist only at discrete locations in space (1, 2, 3, or 4 dimensional, depending on the data type), the required value may need to be interpolated from the point cloud. One common method of interpolating from a point cloud is by constructing a set of triangles with a tuple from the point cloud at each of the vertices of the triangles, each triangle defining a plane. An interpolation algorithm interpolates points from surfaces of these triangular planes. As noted above, such a surface constructed of a series of triangular planes is referred to as a Triangulated Irregular Network (TIN). A top view of a typical triangulated irregular network 78 is depicted in FIG. 6, and also is shown in FIG. 10b as used with a portion of a tile organized point cloud. It is to be understood that FIG. 10b illustrates a portion of a tile organized point cloud, including overlap tiles, that is shown only partially populated with triangulated tuples (each tuple shown as a dot). In practice, the triangulated tuples would extend throughout all tiles of the grid. Likewise, the grid, and each tile, is populated with pixels (only 2 shown in FIG. 10b) arranged in rows. Certain geometric optimizations may be performed to enhance the stability of the triangulation model, the most common being a triangulation technique referred to as Delaunay triangulation. Much is written in the literature regarding the techniques of Delaunay triangulation and on the technique of triangulating a single grouping of point cloud data. However, a Triangulated Irregular Network is not well suited to very large data sets such as those obtained from lidar-equipped aircraft. Such data sets may run tens of gigabytes in size, and during processing must be stored in computer memory as either an in-memory model or in an object database. Since object databases typically have slow random access times and would create unreasonably extended processing times when used with a large triangulated irregular network model, a suitable file-based storage method for Triangulated Irregular Network models does not exist. To address this problem, and as another feature of the instant invention, a Tiled Triangulated Irregular Network format with overlap between tiles is provided, a portion of being shown in FIG. 10b. This data structure is referred to as a Tiled Overlapping Triangulated Irregular Network (TOTIN).

The Tiled Overlapping Triangulated Irregular Network is basically a collection of triangulated irregular networks, each with a base size corresponding to a Tiled, Organized Point Cloud Model as discussed above. Each tile of such a network overlaps a border of a corresponding Tiled, Organized Point Cloud Model tile by a distance equivalent to the Overlap tile, also as previously shown and described.

Referring to FIG. 10b, the tiled structure of FIG. 10a is constructed using a grid of tiles 133 and overlap tiles 135. Appropriate headers and variable length records are generated in memory for the respective tiles and overlap tiles, also as described above.

Figure 12:
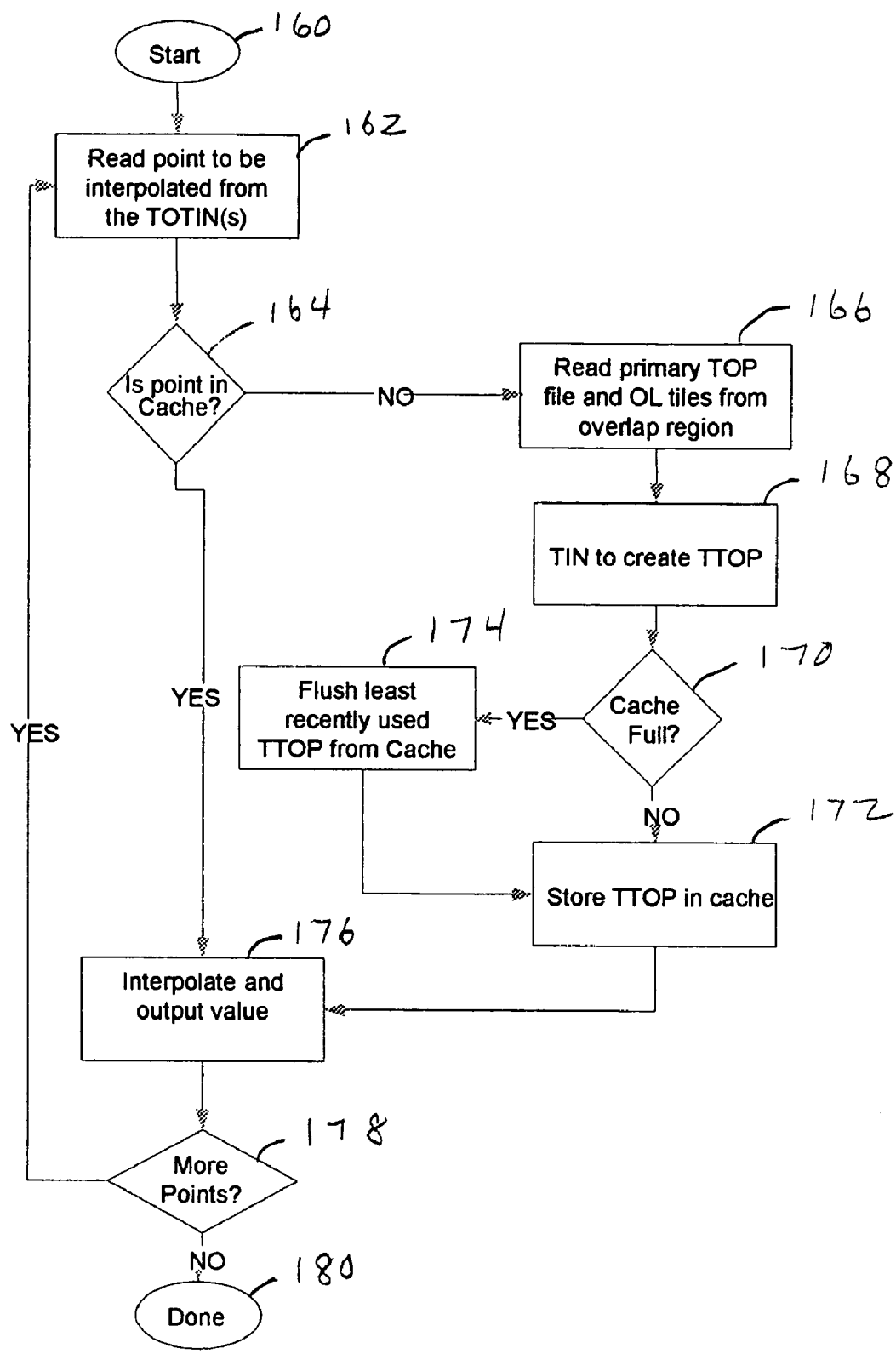
FIG. 12 is a flowchart of how interpolation of point cloud data is implemented using a tiled overlapping triangulated irregular network of the instant invention.

Referring to FIGS. 10b and 12, a program, such as a rendering program, progresses to a point where interpolated access to the point cloud data is required, the following algorithm of the instant invention may be executed:

1. The Tiled Overlapping Triangulated Irregular Network algorithm is initialized for a particular type of interpolation. Any data within the point cloud data may be selected to participate in the interpolation. The only restriction is that the interpolation must be restricted to a distance overlap from an edge of a tiled organized point cloud tile. In other words, the interpolation may only extend to complete triangles formed into overlap regions 135. Any triangles formed by a tuple outside an overlap region of an adjacent tile may not be interpolated from. One example might be interpolation of elevation from 2 dimensional X, Y data organized in a tiled organized point cloud wherein a Z value (height) is contained in each point cloud tuple. In addition, each tuple may contain other data in addition to the Z value. Further, the tiled overlapping triangulated irregular network construction parameters allow introduction of a parallax parameter. This parallax parameter may be used to shift one coordinate scaled by another coordinate to facilitate construction of stereo image models. By way of example, a typical parallax shift of a tiled overlapping triangulated irregular network model may be implemented via the following equation:

$$ShiftedX = X +/- dZ*(Z-Zo)$$

Where dZ is the parallax parameter and Zo is a base elevation at which there will be no x parallax in the stereo imagery. This is done for both images of the stereo pair.

2. Referring again to FIG. 12, at block 162 a point to be interpolated is issued to the Tiled Overlapping Triangulated Irregular Network. Here, a single tile, such as tile Q1, may be triangulated at a time, with the triangulation extending into overlap region 135 of adjacent tiles. The tile size is determined by the point cloud tiling algorithm discussed above. As such, computational requirements for triangulating and interpolating from each tile are minimized. In other embodiments where computational considerations are less important, and the points to be interpolated are spatially organized, an entire row of tiles may be selected for triangulation and interpolation. Prior to interpolation, the tile of interest (Q1) is initially triangulated, and after which the interpolations performed, as by stepping through each of the points to be interpolated, as indicated at block 162 where each point selection is made. Significantly, and as a feature of the invention, when points are selected whose interpolation is taken from tuples falling into an overlap region 135 of an adjacent tile, such as pixel 137 being interpolated from a triangle including a tuple 139 falling in tile Q3 but within the overlap region 135, only tuple data from the overlap tile or region 135 need be retrieved and triangulated, instead of having to retrieve and triangulate tuple data from all adjacent tiles. This significantly reduces computational overhead and memory size, and increases speed of the process.

3. At block 164 (FIG. 12), the query is made as to whether the point to be interpolated is in the Triangulated Irregular Network cache by determining if the cache contains a triangulated tile associated with the point under consideration. If there is no triangulated tile associated with the point of interest, meaning that the point under consideration is in a different, untriangulated tile, then such different tile along with its overlap tile or regions are accessed at block 166 and triangulated at block 168. The triangulated tile and its overlap region 135 are stored in a triangulated irregular network cache, usually a computer memory cache as opposed to a hard drive cache, and as stated, the points therein stepped through one at a time and the interpolations performed. Typically, several triangulated tiles, such as tiles Q1 and Q2, and including their triangulated overlap tiles 135 into untriangulated tiles Q3 and Q4, may be stored in the triangulated irregular network cache at a time.

The query is made at block 170 as to whether the triangulated irregular network cache is full, and if so then at block 174 the least recently accessed Triangulated Tile in the cache is flushed, and the Triangulated Tile of interest stored in cache 172. Where the cache is not full, then at block 172 the newly-triangulated tile and overlap tile or region associated with the point of interest is stored.

4. The requested data may then be interpolated at block 176 from the triangulated tile and overlap tile that was stored in the cache using one of the Triangulated Irregular Network interpolation methods as mentioned above. At block 178 the query is made as to whether another point is available to be read for interpolation, and if another point is available then the program loops back to block 162 and the process repeats. If all the points have been interpolated, then the program exits. It is significant to note that a Triangulated Tiled, Organized Point Cloud tile is a stand-alone triangulated irregular network with a triangulated overlap into adjacent tiled, organized point cloud tiles equivalent to size of an overlap tile. This means that adjacent triangulated tiled organized point cloud tiles overlap one another by the width of an overlap tile and that these overlapping regions use the same data used in generating a respective triangulated irregular network. This overlap assures that in all but the most severe cases, i.e. a paucity of point cloud data, the triangulated irregular networks will match at their edges. Note also, and as stated, that the cache is not necessarily a cache located in computer memory. The generated Triangulated Tiled, Organized Point Cloud tiles can be cached in disk files and instantiated into memory when required. This technique is referred to as multilevel caching and is efficient when Triangulated Tiled, Organized Point Cloud tiles will be frequently accessed in an unordered manner. This efficiency results from the fact that it typically takes longer to triangulate a Tiled, Organized Point Cloud (creating a TTOP) than is required to load a cached Triangulated Tiled, Organized Point Cloud from an on-line storage device into memory.

Metric Analysis Image

As another feature of the instant invention, a metric analysis image ("metric image") is provided to make possible geometrically precise measurements. In the two dimensional raster analysis images discussed above, emphasis has been on attribute data discrimination, such as differentiating void areas from surface classified areas or one surface classification from another. In forming these images, geometric shifts may be inadvertently introduced as an artifact of precise preservation of attribute data.

In the metric image method of the instant invention, a very large raster image or images are constructed from a group of one or more point clouds that spatially reside within the image area of interest.

A primary reason for constructing the raster image is to facilitate very rapid access and manipulation of data in workstations and software that has been optimized for processing raster data. Once rasterized, these metric images can use common raster optimization techniques such as multi-resolution pyramids, filtering, tiled access schemes and even compression algorithms to facilitate viewing large amounts of visual content contained in the image in a short amount of time.

In the instant invention, construction of a metric image proceeds generally by precisely interpolating a uniform raster image from a Tiled Overlapping Triangulated Irregular Network (TOTIN) surface model as described previously. The implementation of the instant invention is unique in that data may be processed into an image of arbitrarily large size and multiple values may be used from data tuples used in formation of an image. For example, as previously discussed, two or more attributes from a tuple can be used to construct an intensity modulated image.

Both monoscopic and stereoscopic metric analysis images may be constructed.

Monoscopic Metric Analysis Image

The Monoscopic Metric Analysis Image (MMAI) is a uniform raster rendition of point cloud data tuples that is used typically to perform precise planimetric data extraction. For example, a Monoscopic Metric Analysis Image may be used in a common Geographic Information System software application as an exact substitute for a digital orthophoto from which accurate data measurements may be made.

Figure 13:
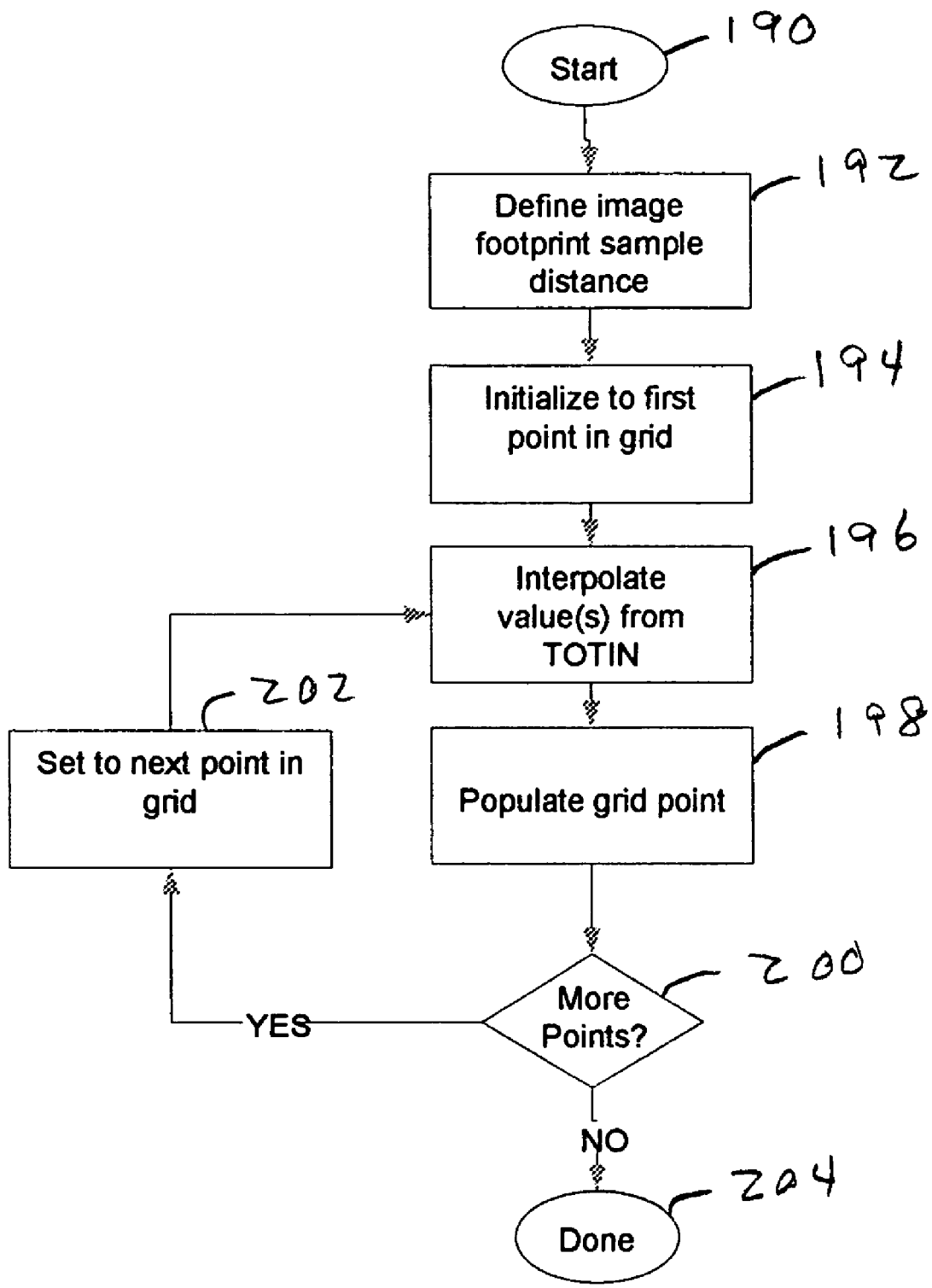
FIG. 13 is a flowchart illustrating how a monoscopic metric analysis image is developed.

The step by step procedure for generating a Monoscopic Metric Analysis Image of the instant invention is illustrated in FIG. 13 and described as follows:

1. The footprint and pixel spacing of a desired Monoscopic Metric Analysis Image is determined at block 192. Construction considerations are as follows:

a. There will be void pixels anywhere the footprint of the image does not include portions of the source point cloud data.

b. in general, the Nyquist criteria should be obeyed.

2. The pixels of the Monoscopic Metric Analysis Image are stepped through, one at a time, beginning at block 194.

For each pixel, the Tiled Overlapping Triangulated Irregular Network (TOTIN) algorithm as described above is called upon at block 196 to provide an interpolated value, and the grid point representative of a pixel in the Monoscopic Metric Analysis Image is populated with the interpolated value at block 198. A test at branch 200 passes control to block 202, which advances to the next pixel in the grid, until all pixels have been populated. The result of this process is a uniform raster image interpolated from the original point cloud data. It should be noted that any desired parameter(s) can be used to form the Monoscopic Metric Analysis Image. Examples of such parameters include:

1. Interpolating height of a surface from a Triangulated irregular Network developed from a point cloud using a height attribute (Z) and the result rendered in the image as either a gray scale or color value proportional to height.

2. Interpolating intensity from a Triangulated irregular Network developed from a point cloud using an intensity attribute and the result rendered in the image as a gray scale value proportional to intensity.

Additional tuple raw or interpolated attribute information from the original point cloud is attached to the pixel in the image. This additional information may be used either directly in exploitation software or as an input for a subsequent processing operation. An example might be to interpolate the Z (height) attribute of the data and use this resultant compound pixel in exploitation software to directly extract three dimensional vector data from the two dimensional visualization. Rendering the interpolated intensity return (here the Triangulated Irregular Network is used to weight the laser intensity value) as the Monoscopic Metric Analysis Image pixel value in a gray level. This type of image is extremely useful for performing direct planimetric measurements.

4. Interpolating a return intensity as described above and using an interpolated intensity return to modulate classification of a tuple that is spatially closest in the Triangulated Irregular Network to the point being constructed in the Monoscopic Metric Analysis Image. Here, and referring to FIG. 10*b*, pixel 141 is under consideration, and the nearest tuple is 143. The classification of the resultant image pixel 141 is therefore taken from tuple 143, and the modulating intensity is interpolated from the triangle defined by the 3 tuples bounding pixel 141.

5. Performing the computations of item 4 above but using the stacking algorithms previously described as a further discriminator of point color rendering. That is, if the closest point is of lower priority than the next closest point then select the next closest point for populating a grid intersection representative of a pixel.

Combinations of 1-5 may be implemented but incorporating algorithmically computed values at the grid intersections representative of pixels. For example, slope of a Triangulated irregular Network surface at a point of generation of a Monoscopic Metric Analysis Image pixel may be computed using either direct slope or sun shaded slope to render the Monoscopic Metric Analysis Image pixel. In addition, any hybrid combination of the above algorithms may be used.

It is to be noted that the Gradated Nyquist Analysis Image previously presented can be characterized as a variant Monoscopic Metric Analysis Image or the Stereoscopic Metric Analysis Image (discussed in the following section).

Stereoscopic Metric Analysis Image

The Stereoscopic Metric Analysis Image (SMAI) is a pair of uniform raster renditions of point cloud data tuples rendered such that when viewed through a commercial off-the-shelf stereo visualization system results in precise metric stereoscopic vision. Examples of such stereo visualization systems include the products ImageStation™ Stereo Display from the Intergraph™ Corporation and Summit Evolution™ from DAT/EM™ Corporation.

The Stereoscopic Metric Analysis Image is typically used to perform precise stereoscopic data extraction. For example, a Stereoscopic Metric Analysis Image could be used in a common photogrammetric stereo software application as an exact substitute for a digital stereo photo pair from which precise measurements may be extracted.

Yet another aspect of the instant invention is the overall concept of rendering a stereo raster image directly from three-dimensional point cloud data.

Figure 14:
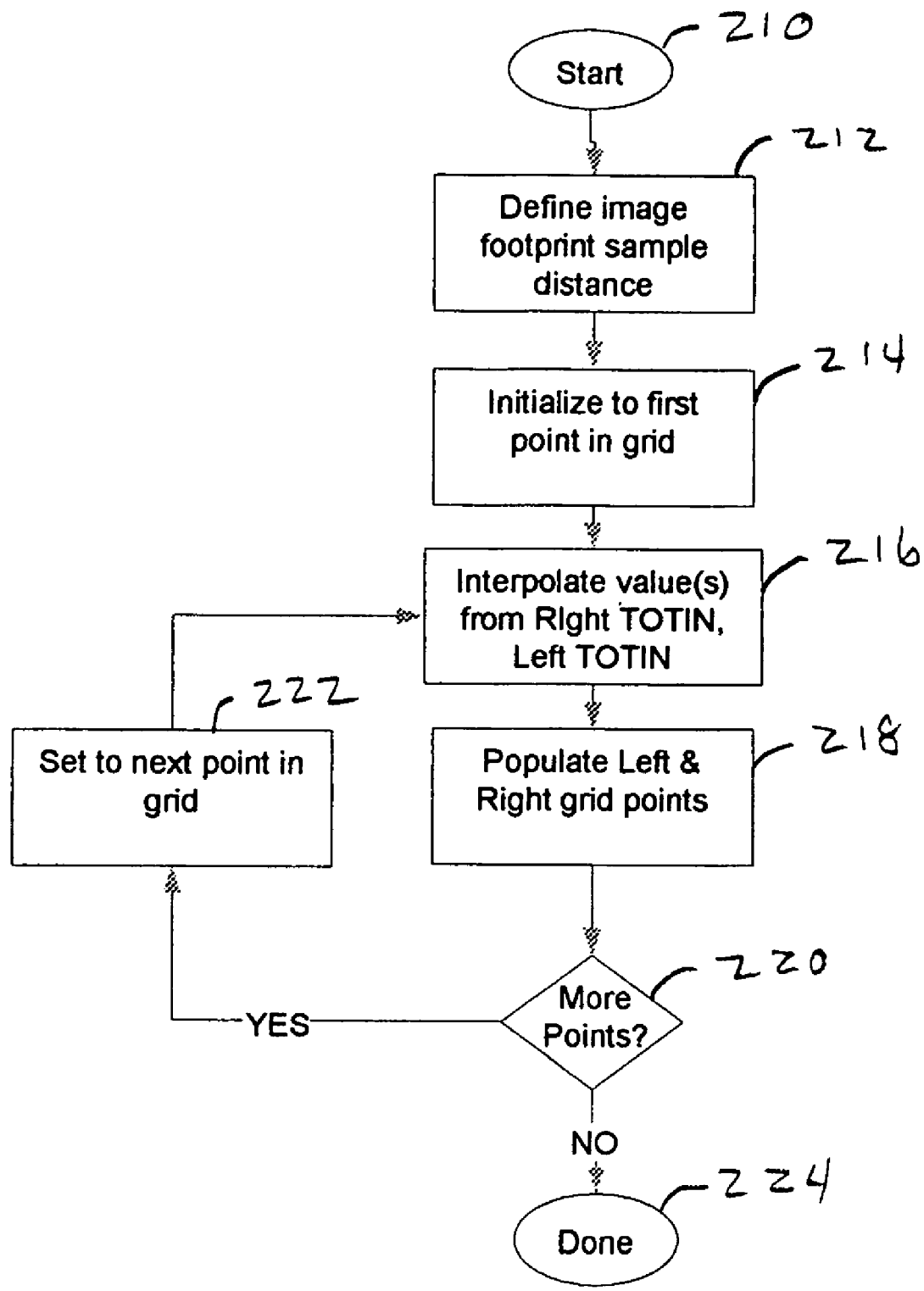
FIG. 14 is a flowchart illustrating how a stereoscopic metric analysis image is developed.

One method of generating a Stereoscopic Metric Analysis Image is illustrated in FIG. 14 and described as follows:

1. The footprint as described above and pixel spacing of the desired Stereoscopic Metric Analysis Image is determined at block 212. Construction considerations are as follows:
    a. anywhere the footprint does not overlap the source point cloud data will result in void pixels.
    b. in general, the Nyquist criteria should be obeyed.
2. Also at block 212, elevation exaggeration, dZ, is set. This value is used to compute a stereo base-to-height ratio.
3. Two separate Tiled Overlapping Triangulated. Irregular Networks are also started at block 212; one for generating a left image and the other for generating a right image of a stereoscopic pair. The Tiled Overlapping Triangulated Irregular Networks are initialized as right-shifted or left-shifted Tiled Overlapping Triangulated Irregular Networks and supplied the value dZ. dZ is a scale value used in the Tiled Overlapping Triangulated Irregular Network algorithm to shift each of the left and right eye points during construction (this process was described in the section on the Tiled Overlapping Triangulated Irregular Network). Larger dZ values cause greater stereo exaggeration while smaller dZ values result in less stereo exaggeration.
4. Beginning at block 214, pixels of the Stereoscopic Metric Analysis Image are stepped through, one at a time. For each pixel the Stereoscopic Metric Analysis Image algorithm is called in block 216 to provide an interpolated value, one call for the left image of the stereo pair and a second call for the right image of the stereo pair.
5. Corresponding pixels in left and right raster images of the stereo pair are populated at block 218 based on values interpolated at block 216. A test at branch 220 passes control to block 222, which advances to the next pixel in the grid, until all pixels have been processed. The result of this process is a uniform raster stereo image pair interpolated from the original point cloud data. It should be noted that any desired parameter(s) can be used to form the Stereoscopic Metric Analysis Image. Examples include
    1. Interpolating height from a Triangulated Irregular Network using a Z attribute and rendering this result in the image as either a gray scale or color value proportional to height.
    2. Interpolating intensity from a Triangulated Irregular Network developed from a point cloud using an intensity attribute and the result rendered in the Stereoscopic Metric Analysis Image pixel value as a gray level. This type of image is extremely useful for performing direct stereoscopic measurements.
    3. Interpolating intensity from a Triangulated irregular Network developed from a point cloud using an intensity attribute and the result rendered in the image as a gray scale value proportional to intensity. Additional tuple raw or interpolated attribute information from the original point cloud is attached to the pixel in the image. This additional information may be used either directly in exploitation software or as an input for a subsequent processing operation. An example might be to interpolate the Z (height) attribute of the data and use this resultant compound pixel in exploitation software to directly extract three dimensional vector data from the two dimensional visualization. Rendering the interpolated intensity return (here the Triangulated Irregular Network is used to weight the laser intensity value) as the Stereoscopic Metric Analysis Image pixel value in a gray level.
    4. Interpolating the return intensity as described above and using this to modulate the classification of the tuple which is spatially closest in the Triangulated Irregular Network to the point being constructed in the Stereoscopic Metric Analysis Image.
    5. Performing the computations of item 4 above but using the stacking algorithms previously described as a further discriminator of point color rendering. That is, if the closest point is of lower priority than the next closest point then select the next closest point for populating a grid intersection representative of a pixel.

Combinations of 1-5 may be implemented but incorporating algorithmically computed values at the grid intersections representative of pixels. For example, slope of a Triangulated irregular Network surface at a point of generation of a Stereoscopic Metric Analysis Image pixel may be computed using either direct slope or sun shaded slope to render the Stereoscopic Metric Analysis Image pixel. In addition, any hybrid combination of the above algorithms may be used.

It is noted that the Gradated Nyquist Analysis Image previously presented can be characterized as a variant of Stereoscopic Metric Analysis Image or Stereoscopic Metric Analysis Image.

Having thus described our invention and the manner of its use, it should be apparent to those skilled in the arts that incidental modifications may be made that fairly fall within the scope of the following appended claims, wherein we

1. A method for organizing tuples of a point cloud wherein said tuples contain data related to physical features comprising:
    constructing a virtual grid having a plurality of intersections over said point cloud of tuples, said intersections spaced in accordance with a desired spatial frequency, each intersection of said intersections associated with a predetermined data structure,
    subdividing said virtual grid into tiles of a predetermined size, each tile of said tiles containing a plurality of said intersections,
    developing a plurality of separate tile records, one tile record for each said tile,
    storing tuple data from said tuples falling in each said tile in a respective said tile record so said tuple data related to a selected region of said point cloud is quickly retrievable by accessing only said tuple data stored in those said tile records associated with said selected region,
    defining an overlap tile along each boundary where two adjacent said tiles meet, said overlap tile extending into each of said adjacent tiles so that said tuples in said overlap tile may be treated as belonging to one or the other or both of said adjacent tiles,
    when a region in said point cloud is selected, triangulating only said tuples in said tiles and said overlap tiles of a selected said region into a linked triangulated network, with tuples in said overlap tiles along edges of said selected region allowing completion of a triangulation process, eliminating a need for triangulating all tuples in an adjacent tile and increasing computational speed of the process,
    populating at least most of said predetermined data structures with data interpolated from said triangulated network, said triangulated network extending into said overlap tiles, and,
    using said data in said data structures to develop a display of said physical features in said selected region.
2. A method as set forth in claim 1 further comprising:
    developing said triangulated network in one said tile, said triangulated network including said overlap tiles associated with said one tile, storing said triangulated network associated with said one tile and associated said overlap tiles, repeating said developing a triangulated network and storing said triangulated network until all said tiles and associated said overlap tiles of said virtual grid are separately triangulated and stored.

3. A method as set forth in claim 2 further comprising:
retrieving a group of separately stored triangulated networks associated with a plurality of adjacent said tiles and said associated overlap tiles, said group representative of only said selected region, and wherein said triangulated overlap tiles cause adjacent said tiles to match at their edges, forming a single triangulated network from a retrieved said group of stored triangulated networks.

4. A method as set forth in claim 3 further comprising:
interpolating pixel values from said single triangulated network, associated with said at least one tile and associated said overlap tiles,
developing an image from interpolated said pixel values.

5. A method as set forth in claim 2 further comprising retrieving said separately triangulated networks containing said selected region and forming a single triangulated network therefrom in order to rapidly display said physical features of said selected region.

6. A method as set forth in claim 1 wherein said using said data in said data structures to develop said physical features of said selected region further comprises:
defining said selected region as a footprint for a monoscopic metric analysis image within said virtual grid,
selecting at least one tuple parameter for interpolation,
associating intersections within said footprint with respective pixels of said display,
populating a respective said data structure for each said intersection with an interpolated said at least one tuple parameter from said triangulated network,
using said pixels of said display to display interpolated said at least one parameter values as a monoscopic metric analysis image of said features, said monoscopic metric analysis image usable as a digital orthophoto.

7. A method as set forth in claim 6 wherein said at least one tuple parameter further comprises selecting said at least one tuple parameter from the group comprising:
a height attribute from said triangulated network,
an intensity from said triangulated network,
a return intensity and using an interpolated return intensity to modulate a classification of a nearby tuple,
a return intensity using a second selected attribute of a nearby tuple.

8. A method as set forth in claim 1 further comprising:
establishing a stereo exaggeration value,
developing a pair of tiled overlapping triangulated networks of said selected region, a first said tiled overlapping triangulated network for a right eye and a second said tiled overlapping triangulated network for a left eye,
interpolating pixel values for said first tiled overlapping triangulated network and pixel values for said second tiled overlapping triangulated network using said stereo exaggeration to shift said first tiled overlapping triangulated network and said second tiled overlapping triangulated network, and,
populating pixels of a right image with shifted interpolated said pixel values for said first tiled overlapping triangulated network and pixels of a left image with shifted interpolated said pixel values for said second tiled overlapping triangulated network to provide a stereo pair of images.

9. A method as set forth in claim 1 wherein said populating at least most of said predetermined data structures with said data obtained at said intersections further comprises:
defining surfaces within triangles of said triangulated network,
extrapolating from said surfaces at said intersections to obtain said data for populating said predetermined data structures.

10. A method as set forth in claim 9 further comprising introducing a parallex parameter in interpolated said tuple data for developing a pair of stereo images that provide stereoscopic viewing.

11. A method as set forth in claim 1 wherein said display is a raster image comprising pixels.

12. A method as set forth in claim 11 further comprising associating said pixels of said raster image with respective said intersections, and computing values of each pixel of said pixels using a populated said predetermined data structure of a respective said intersection based upon said tuple data.

13. A method as set forth in claim 11 further comprising selecting said desired spatial frequency of said intersections to be similar to or the same as spacing of said pixels of said raster image.

14. A method a set forth in claim 11 further comprising associating said pixels of said raster image with respective said intersections until at least most of said pixels are assigned a value based on a populated said data structure of respective said intersections.

15. A method as set forth in claim 11 further comprising determining from said display whether or not a density of populated said predetermined data structures of said intersections meets a Nyquist sampling criteria for said desired spatial frequency.

16. A method as set forth in claim 1 further comprising:
receiving a sequential list of said tuples,
for each said tuple of said sequential list of said tuples, determining a nearest said intersection in said virtual grid,
populating said predetermined data structure associated with said nearest intersection using said tuple data from a first-found said tuple nearest said intersection,
disregarding tuple data from other said tuples near a previously-populated said intersection, thereby thinning said tuple data.

17. A method as set forth in claim 1 further comprising designating as void a pixel associated with an unpopulated said data structure, and assigning at least a color to a void said pixel.

18. A method as set forth in claim 17 further comprising determining conformance to Nyquist sampling criteria of said point cloud by displaying said color assigned to void said pixels in said display.

19. A method as set forth in claim 1 wherein each said data structure is populated using only a portion of said tuple data.

20. A method as set forth in claim 1 further comprising:
developing surfaces from triangles of said triangulated network,
for each intersection of said intersections that falls within a triangle of said triangulated network, locating a nearest tuple from a vertex of a respective said triangle, and,
assigning a color to a pixel associated with said intersection nearest said vertex based on a first selected attribute of said nearest tuple.

21. A method as set forth in claim 20 further comprising assigning an intensity to at least some of said colors based on a second selected attribute of said nearest tuple, for developing details about said surfaces.

22. A method as set forth in claim 1 further comprising:
assigning a plurality of priorities to a corresponding plurality of attributes of said tuples,
with respect to each said intersection wherein at least two said tuples of differing priority are nearby, considering a priority of said priorities of each of said at least two tuples,
inserting attribute data from a said tuple of said at least two tuples having a highest priority of said plurality of priorities into said data structure corresponding to said intersection, whereby visualization of higher priority said attributes is enhanced on said display.

* * * * *